US012620206B2

(12) United States Patent
Katole et al.

(10) Patent No.: US 12,620,206 B2
(45) Date of Patent: May 5, 2026

(54) TRAINING DATA SYNTHESIS FOR MACHINE LEARNING

(71) Applicant: Schlumberger Technology Corporation, Sugar Land, TX (US)

(72) Inventors: Atul Laxman Katole, Houston, TX (US); Purnaprajna Raghavendra Mangsuli, Pune (IN); Hiren Maniar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 237 days.

(21) Appl. No.: 18/692,076

(22) PCT Filed: Sep. 14, 2022

(86) PCT No.: PCT/US2022/043485
§ 371 (c)(1),
(2) Date: Mar. 14, 2024

(87) PCT Pub. No.: WO2023/043810
PCT Pub. Date: Mar. 23, 2023

(65) Prior Publication Data
US 2024/0355100 A1    Oct. 24, 2024

Related U.S. Application Data

(60) Provisional application No. 63/261,156, filed on Sep. 14, 2021.

(51) Int. Cl.
*G06V 10/774*    (2022.01)
*G06F 16/2452*    (2019.01)
(Continued)

(52) U.S. Cl.
CPC ........... *G06V 10/774* (2022.01); *G06V 10/72* (2022.01); *G06V 10/82* (2022.01); *G06F 16/24522* (2019.01)

(58) Field of Classification Search
CPC ...... G06V 10/774; G06V 10/72; G06V 10/82; G06V 20/52; G06V 10/803;
(Continued)

(56) References Cited

U.S. PATENT DOCUMENTS 9,911,210 B1 *    3/2018    Witte ................... G06T 11/203
10,095,984 B1    10/2018    Venter
(Continued)

FOREIGN PATENT DOCUMENTS

CN        110148088 A        8/2019
WO        2018148492 A1        8/2018

OTHER PUBLICATIONS

H. Xiong and R. Sun, "Transferable Natural Language Interface to Structured Queries Aided by Adversarial Generation," 2019 IEEE 13th International Conference on Semantic Computing (ICSC), Newport Beach, CA, USA, 2019, pp. 255-262, doi: 10.1109/ICOSC. 2019.8665499. (Year: 2019).*
(Continued)

*Primary Examiner* — Delomia L Gilliard
(74) *Attorney, Agent, or Firm* — Kyle R. Miiller

(57)        ABSTRACT

A method can include generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and
(Continued)

predicting a label for an unlabeled feature of an object using the second machine learning model.

18 Claims, 15 Drawing Sheets

(51) Int. Cl.
*G06V 10/72* (2022.01)
*G06V 10/82* (2022.01)

(58) Field of Classification Search
CPC .......... G06F 16/24522; G06F 18/2155; G06F 40/30; G06F 40/40; G06N 3/0455; G06N 3/0464; G06N 3/0475; G06N 3/084; G06N 3/088; G06N 3/09; G06N 3/094; G06N 20/10; G06N 20/202
See application file for complete search history.

(56) References Cited

U.S. PATENT DOCUMENTS

| | | | |
|---|---|---|---|
| 2017/0371856 A1 | 12/2017 | Can et al. | |
| 2018/0033147 A1 | 2/2018 | Becker et al. | |
| 2018/0253873 A1 | 9/2018 | Witte | |
| 2019/0043172 A1 | 2/2019 | Chui et al. | |
| 2019/0180115 A1 | 6/2019 | Zou | |
| 2019/0197358 A1 | 6/2019 | Madani et al. | |
| 2019/0302290 A1* | 10/2019 | Alwon | G01V 1/364 |
| 2020/0335086 A1 | 10/2020 | Paraskevopoulos et al. | |
| 2021/0097371 A1* | 4/2021 | Puscas | G06N 3/0475 |
| 2021/0158104 A1* | 5/2021 | Wu | G06V 10/764 |
| 2021/0165938 A1 | 6/2021 | Bailey | |
| 2021/0174131 A1* | 6/2021 | Schwartz | G06N 3/088 |
| 2022/0067737 A1* | 3/2022 | Wittenbach | G06N 3/047 |
| 2023/0128933 A1 | 4/2023 | Laxman et al. | |

OTHER PUBLICATIONS

Lu et al., "Automated analysis of images in documents for intelligent document search", International Journal on Document Analysis and Recognition (IJDAR), 12.2, pp. 65-81, 2009.

Svendsen, "Chart detection and recognition in graphics intensive business documents", Dissertation, 2015, 166 pages.

Liu et al., "Review of chart recognition in document images", Visualization and Data Analysis 2013, vol. 8654, International Society for Optics and Photonics, 2013, 8 pages.

International Search Report of International Patent Application No. PCT/US2021/020480 on Apr. 28, 2021, 6 pages.

Written Opinion of International Patent Application No. PCT/US2021/020480 on Apr. 28, 2021, 5 pages.

International Preliminary Report on Patentability of International Patent Application No. PCT/US2021/020480 dated Sep. 15, 2022, 8 pages.

Rafkind et al., "Exploring Text and Image Features to Classify Images in Bioscience Literature", Proceedings of the BioNLP Workshop on Linking Natural Language Processing and Biology at HLT-NAACL 06, pp. 73-80, 2006.

Savva et al., "Revision: Automated classification, analysis and redesign of chart images", Proceedings of the 24th annual ACM symposium on User interface software and technology, 11 pages, 2011.

Huang et al., "Chart Image Classification Using Multiple-Instance Learning", 2007 IEEE Workshop on Applications of Computer Vision (WACV07), IEEE, 6 pages, 2007.

Kollem et al., "A review of image denoising and segmentation methods based on medical images", International Journal of Machine Learning and Computing, vol. 9, No. 3, pp. 288-295, 2019.

Xing et al., "Deep CNN for removal of salt and pepper noise", IET Image Processing, 13.9, pp. 1550-1560, 2019.

Huang et al., "a scalable deep learning platform for identifying geologic features from seismic attributes", The Leading Edge, vol. 36, issue 3, pp. 249-256, 2017.

Wu et al., "Convolutional neural networks for fault interpretation in seismic images", SEG Technical Program Exanded Abstracts 2018, Society of Exploration Geophysicists, pp. 1946-1950, 2018.

Extended Search Report issued in European Patent Application No. 21764087.9 dated Dec. 18, 2023, 6 pages.

International Search Report and Written Opinion of the PCT Application No. PCT/US2022/043485 dated Nov. 1, 2022, 9 pages.

Notice of Allowance issued in U.S. Appl. No. 17/908,633 dated Apr. 9, 2025, 32 pages.

Extended Search Report issued in European Patent Application No. 22870616.4 dated Apr. 30, 2025, 10 pages.

Xiong, H. et al., "Transferable Natural Language Interface to Strucured Queries aided by Adversarial Generation", 2019 IEEE 13th International Conference on Semantic Computing, 2019, pp. 255-262.

Office Action issued in U.S. Appl. No. 17/908,633 dated Dec. 13, 2024, 16 pages.

* cited by examiner

System 100
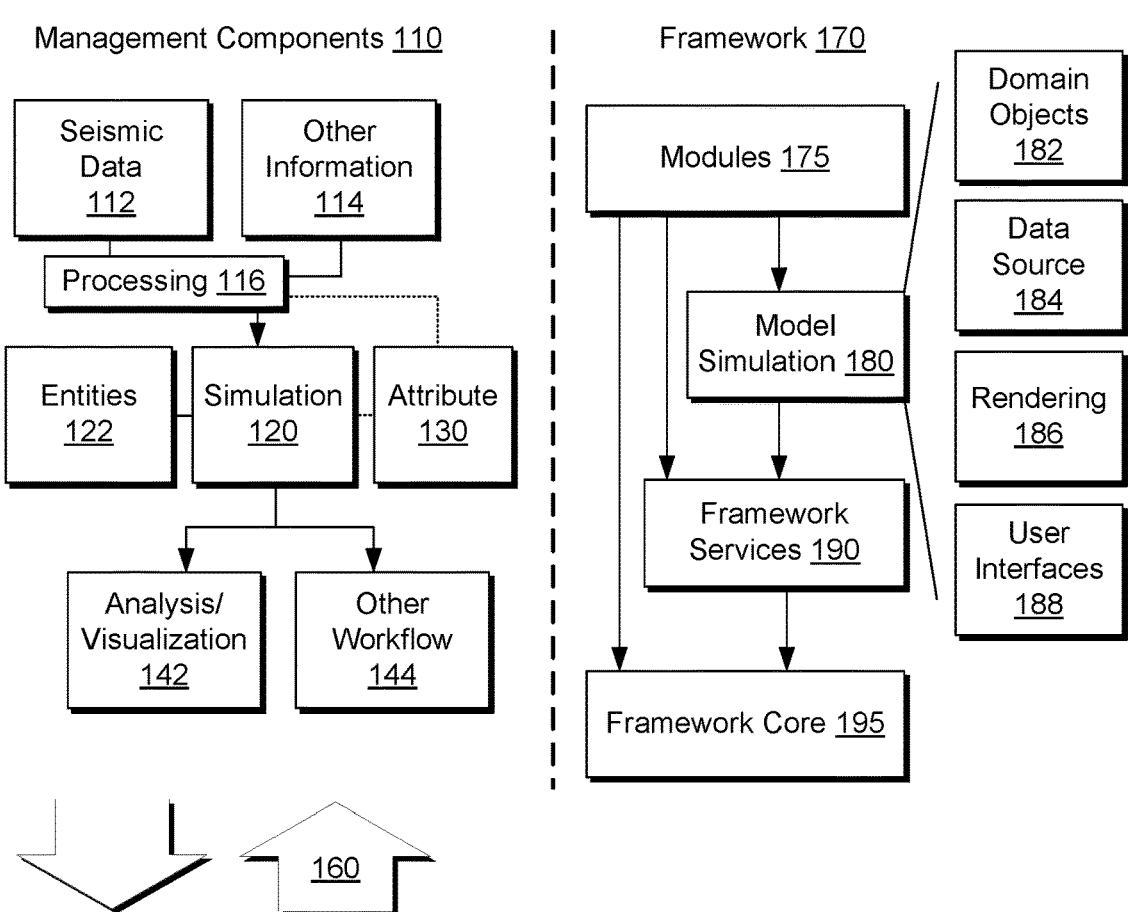
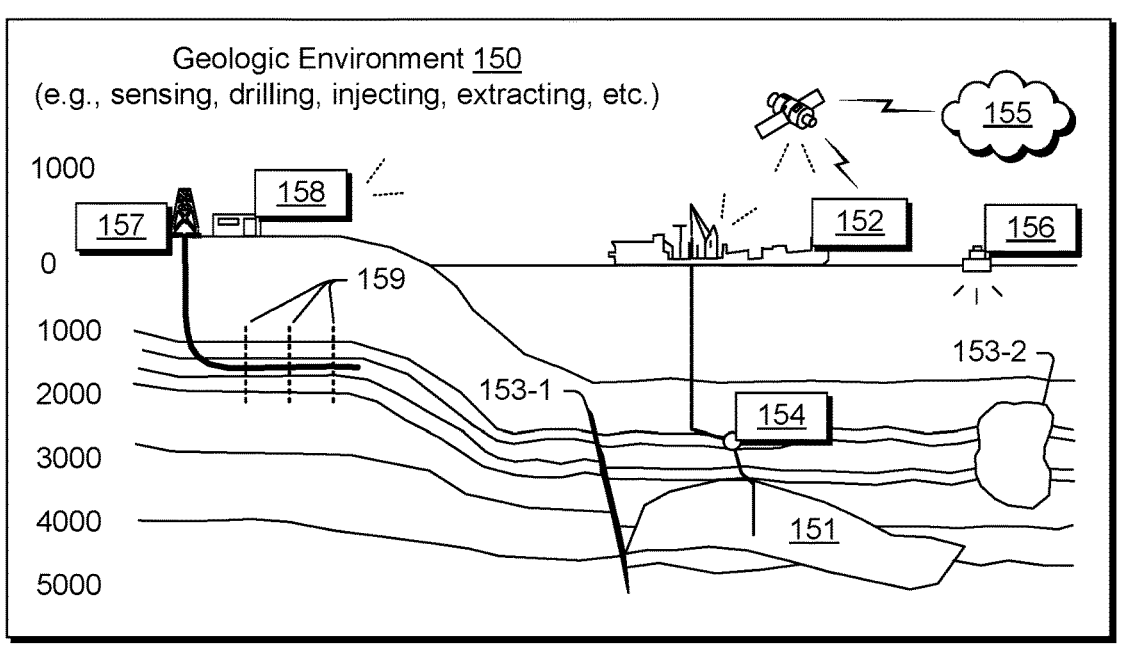
FIG. 1

200

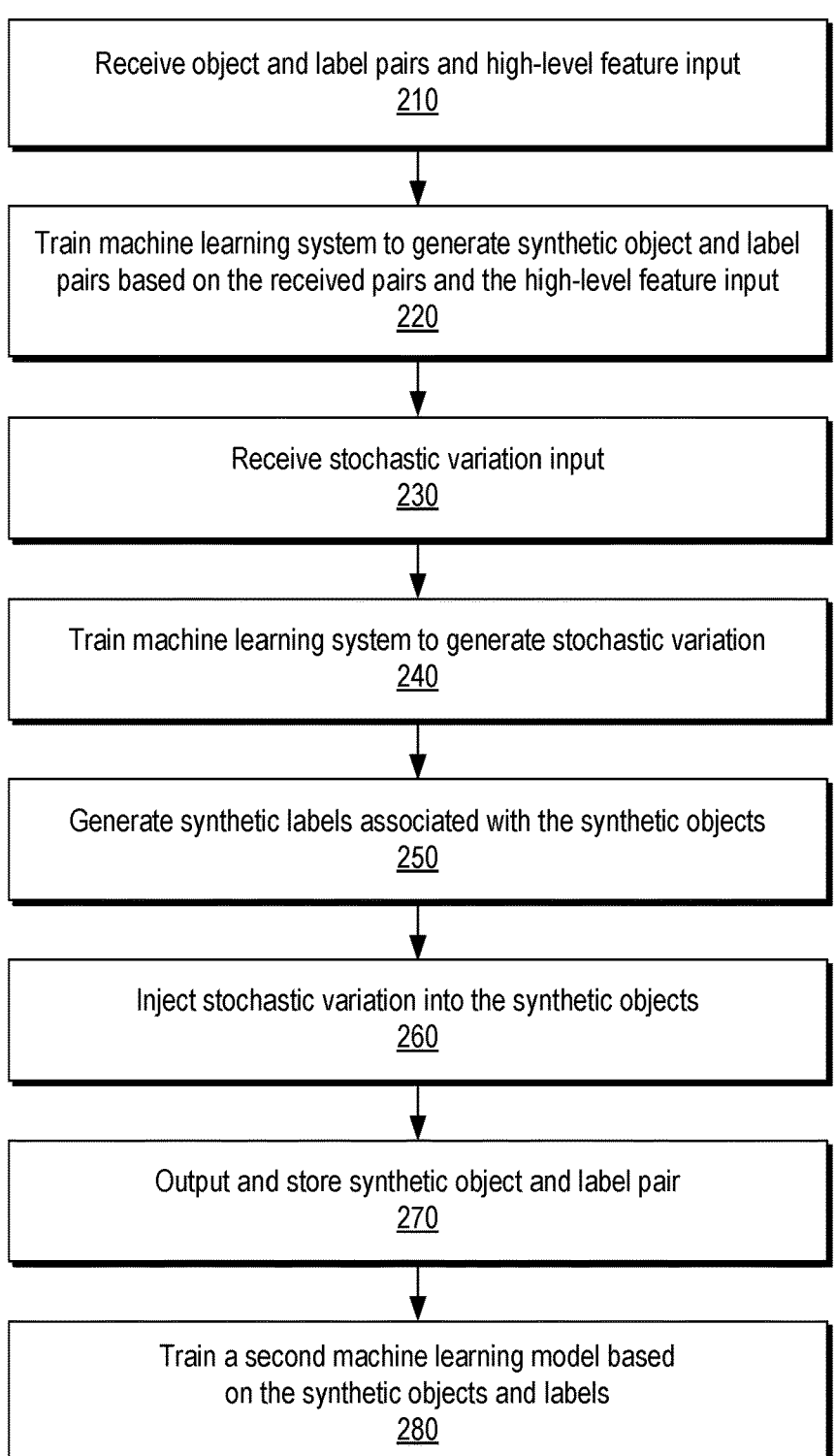

Receive object and label pairs and high-level feature input
210

Train machine learning system to generate synthetic object and label pairs based on the received pairs and the high-level feature input
220

Receive stochastic variation input
230

Train machine learning system to generate stochastic variation
240

Generate synthetic labels associated with the synthetic objects
250

Inject stochastic variation into the synthetic objects
260

Output and store synthetic object and label pair
270

Train a second machine learning model based on the synthetic objects and labels
280

FIG. 2

Width Variation in Curve
512

Intensity Variation in Curve
510

Method 1300

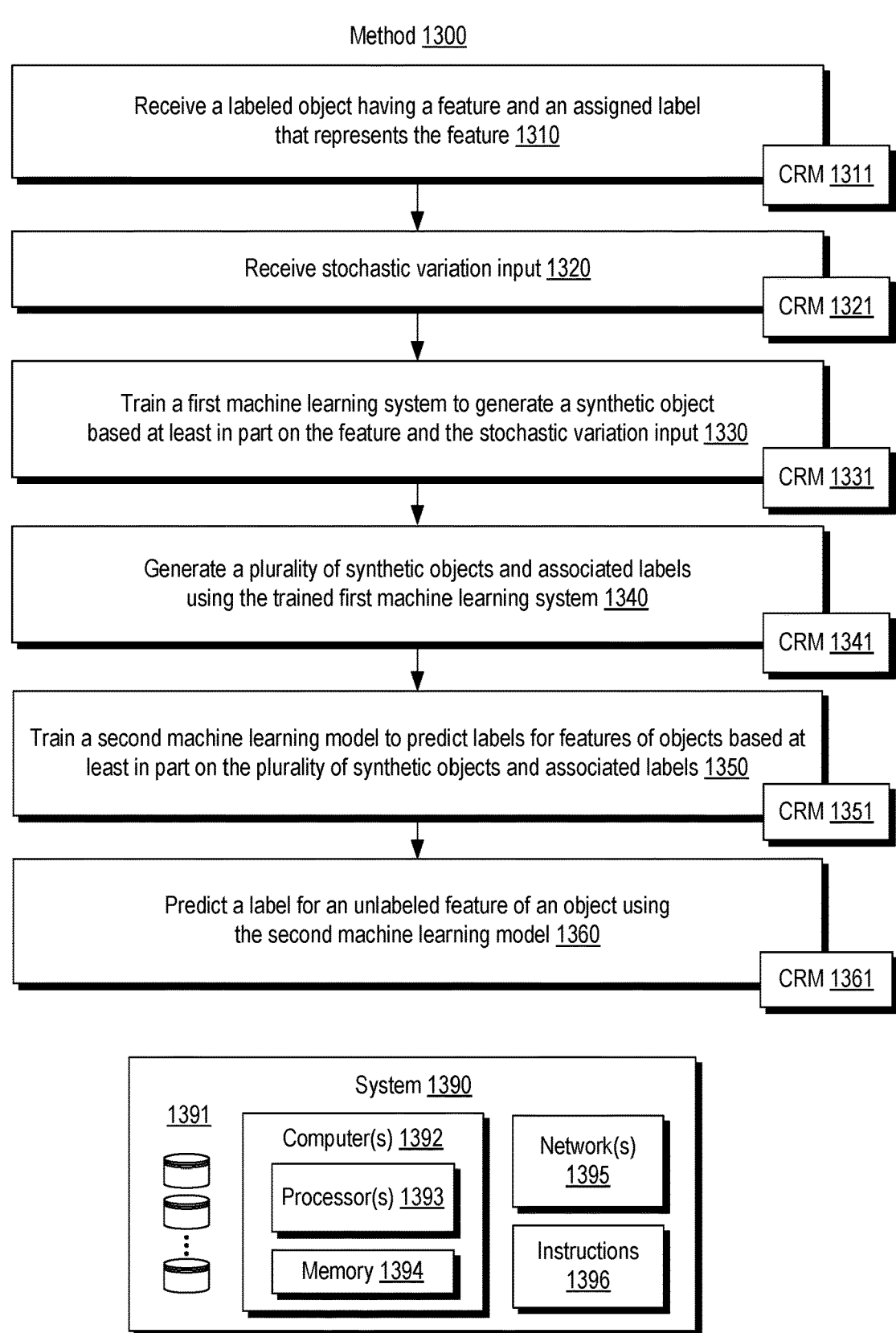

Receive a labeled object having a feature and an assigned label that represents the feature 1310

CRM 1311

Receive stochastic variation input 1320

CRM 1321

Train a first machine learning system to generate a synthetic object based at least in part on the feature and the stochastic variation input 1330

CRM 1331

Generate a plurality of synthetic objects and associated labels using the trained first machine learning system 1340

CRM 1341

Train a second machine learning model to predict labels for features of objects based at least in part on the plurality of synthetic objects and associated labels 1350

CRM 1351

Predict a label for an unlabeled feature of an object using the second machine learning model 1360

CRM 1361

System 1390

1391

Computer(s) 1392

Processor(s) 1393

Memory 1394

Network(s) 1395

Instructions 1396

TRAINING DATA SYNTHESIS FOR MACHINE LEARNING

RELATED APPLICATIONS

This application is a National Stage Entry of International Patent Application No. PCT/US2022/043485, filed 14 Sep. 2022, which claims priority to and the benefit of a U.S. Provisional Application having Ser. No. 63/261,156, filed 14 Sep. 2021, which is incorporated herein by reference in its entirety.

BACKGROUND

Machine learning models may be trained using training data, with the accuracy of the models generally proportional to the quantity and quality of the training data provided. The training data may be provided as "pairs", including the raw data (e.g., an image or another object) and one or more labels that the raw data represents. These pairs are employed to form "connections" within the model, and eventually the model may be able to predict a label associated with new data, based on the data itself. Generally, the data are provided to a machine learning model from manually labeled data sets, which is time intensive. Unsupervised learning methods also exist, but without manual labels to train the machine learning model, unsupervised techniques tend to involve clustering algorithms, which may demand model refinements to provide meaningful clusters.

Various machine learning models find use in computer graphics. In the computer graphics field, a raster graphics or bitmap image is a dot matrix data structure that represents a generally rectangular grid of pixels (points of color, grayscale, black and white), viewable via a bitmapped display (monitor). Raster images can be stored in image files with varying dissemination, production, generation, and acquisition formats. Common pixel formats include monochrome, grayscale, palletized, and full color, where color depth determines the fidelity of the colors represented and color space determines the range of color coverage, which may be less than the full range of human color vision.

Raster images of seismic data and well logs may include segments as log header segments, curve segments, tables, text blocks, graphs, and/or other segments. Curve segments can represent petrophysical properties of rocks and their contained fluids in the form of graphs, as may be based on sensed data from one or more sensors. Values and meaning of curve segments are generally recognizable using information provided by a log header, text blocks, and other segments. A "legacy" raster image of seismic data may include images generated prior to digital data acquisition techniques. A legacy raster image may be a scanned image saved as a computer image file. Image files may adequately depict the non-digital log data such that a human user can review and understand the information collected; however, the files may not include the digital data represented by the curve, e.g., the values for the properties and depths that the curve represents.

A machine learning model can be trained to extract information from raster images using training pairs of raster images and labels. However, again, the labeling process is time intensive. Thousands of pairs may be needed to adequately train a model, particularly where images are in a variety of formats. Further, "noise" may be present in scans of images (e.g., artifacts such as smudges that do not contain data that is represented by the curve), which can call for ever-larger training data sets to adequately train a machine learning model to handle.

Another area where machine learning is applied is natural language processing. In particular, a machine learning model may be trained to interpret a natural language query from a user, and predict the syntax that is associated with this natural language query for database searching, to name one specific example. Natural language queries may be difficult to predict, as different users may employ different words in different orders. Moreover, especially in the context of oilfield environments, connections may be made between different types of data that may not be included in the natural language queries, but may assist in providing useful results.

SUMMARY

A method can include generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

A non-transitory, computer-readable medium storing instructions that, when executed by at least one processor of a computing system, can cause the computing system to perform operations, where the operations can include: generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

A computing system can include one or more processors; and a memory system including one or more non-transitory computer-readable media storing instructions that, when executed by at least one of the one or more processors, can cause the computing system to perform operations, where the operations can include: generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 1 illustrates an example of a system that includes various management components to manage various aspects of a geologic environment, according to an embodiment.

FIG. 2 illustrates a flowchart of a method for synthesizing training pairs of objects and label for training a machine learning model, according to an embodiment.

FIG. 13 illustrates an example of a method and an example of a system according to an embodiment.

DETAILED DESCRIPTION

Figure 3:
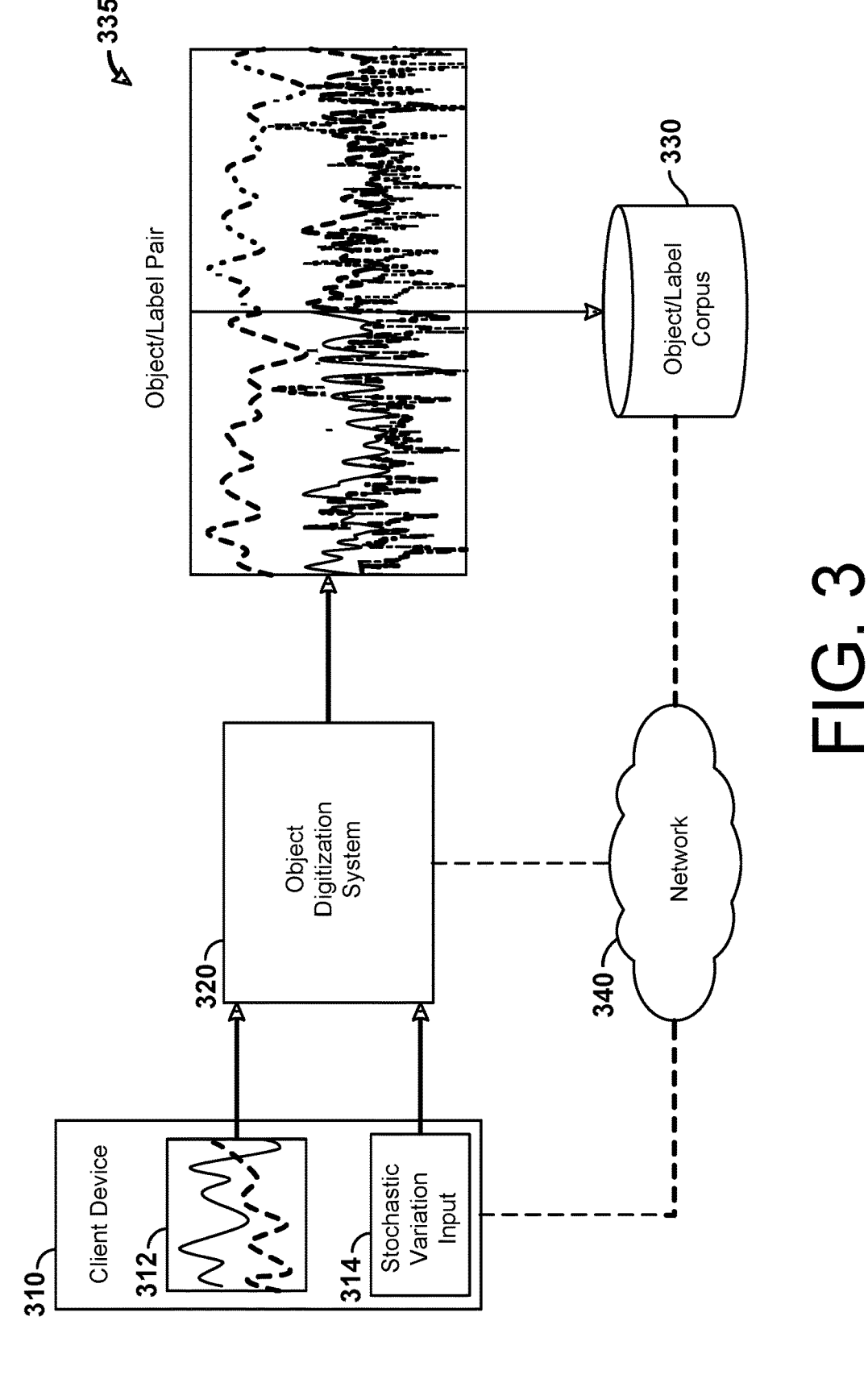
FIG. 3 illustrates a system for synthesizing the training pairs, according to an embodiment.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT.NET framework (Redmond, Washington), which provides a set of extensible object classes. In the .NET framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE reservoir simulator (Schlumberger Limited, Houston Texas), the INTERSECT reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL seismic to simulation software framework (Schlumberger Limited, Houston, Texas). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN framework environment (Schlumberger Limited, Houston, Texas) allows for integration of add-ons (or plug-ins) into a PETREL framework workflow. The OCEAN framework environment leverages .NET tools and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

A framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

FIG. 1 also shows an example of a framework 170 that includes a model simulation layer 180 along with a framework services layer 190, a framework core layer 195 and a modules layer 175. The framework 170 may include the commercially available OCEAN framework where the model simulation layer 180 is the commercially available PETREL model-centric software package that hosts OCEAN framework applications. In an example embodiment, the PETREL software may be considered a data-driven application. The PETREL software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a workstep may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework, the DELFI environment, etc. As an example, a workflow may include one or more worksteps that access a module such as a plug-in (e.g., external executable code, etc.).

FIG. 2 illustrates a flowchart of a method 200 for synthesizing training data for a machine learning model, according to an embodiment. As a general overview, the synthetized training data may be employed, for example, to label and assist with digitizing raster images of oilfield data, e.g., well logs, seismic survey logs, etc. In other embodiments, the synthesized training data may be employed to train machine learning models to predict database queries/commands from natural language queries received as input. In particular, such machine learning models may be trained to associate natural language queries/commands to particular fields in the database, for example, data that were not specifically requested using a proper syntactic query, but which may be useful as a response to the natural language query, based on the associations made in an oilfield context.

The method 200 may include receiving feature input as well as object and label pairs, as at block 210. The objects may each include one or more features, as informed by the feature input, as will be described in greater detail below. For example, the objects may be well logs or seismic logs, which may include sections, such as header sections, plot sections, and depth tracks, each of which, the specific combination of which, and the arrangement of which, may be a feature of the object. Further, the individual sections may include data fields, which may further be features of the object. In another embodiment, the objects may be free-form or "natural language" text, which may be entered by a human user, e.g., in the form of a question. Such text-based objects may also include features, which may be data such as operator, field needs, etc., as will be described in greater detail below. Further, the order in which these data fields are provided may be a feature of the text-based objects.

The method 200 may also include training a first machine learning model to generate synthetic objects based on (e.g., manually) labeled pairs of objects and labels and high-level feature input, as at block 220. The first machine learning model may be trained on a relatively low number of objects, e.g., on the order of tens of labeled synthetic objects. Further, the high-level feature input may be provided to the coarser levels of the first machine learning model, and may constrain the operation of the first machine learning model, e.g., specifying the features of the output synthetic objects. The first machine learning model may vary the data within the feature constraints of the objects in order to generate different objects that are similar to but not the same as the input objects.

The method 200 may further include receiving stochastic variation input, as at block 230. The stochastic variation input may be provided to one, some, or each level of the first machine learning model. The stochastic variation input, as will be described in greater detail, may be a Gaussian, single-channel noise. The first machine learning model may, based on this input, be trained to generate stochastic variation, as at block 240. The machine learning model may then inject the variations into the synthetic objects, resulting in stochastic variations in the synthetic objects (i.e., Stochastic variation output), as at block 250. Such stochastic variation output may include, for example, grid lines, broken curve lines, image artifacts (e.g., spots, smudges, etc.), line width variations, and/or typographical errors, different fonts, different syntax or grammar usage, etc.

The machine learning model may also label the synthetic objects, e.g., annotate the objects with the location of, values for, etc. of the features contained in the synthetic objects, as at block 260. The resulting pairs of synthetic objects and associated labels may then be outputted or stored, as at block 270. Further, the pairs of synthetic object and labels may be provided to a second machine learning model, which may be trained to predict labels based on the synthetic objects, as at block 280. The second machine learning model may thus, for example, convert image-based objects into data files that contain digital representations of the data represented by the images (e.g., coordinates of curves and associated values). In some embodiments, the digitized objects may be displayed and manipulated, e.g., showing values for specific locations within the curves, which may not have otherwise been possible on a plain image file. Likewise, in a text-based object scenario, the second machine learning model may be configured to return search results, which may be displayed on a computer screen, based on natural language queries that are converted to one or more database language queries.

FIG. 3 illustrates a schematic view of a system 300 for synthesizing objects and label pairs, according to an embodiment. The system 300 may include a client device 310, e.g., one or more types of computing devices. The client device 310 may receive feature input 312 and stochastic variation input 314, as discussed above. The feature input 312 and stochastic variation input 314 may be provided to an object synthesis system 320, which may be another computing device (e.g., a server). The systems 310 and 320 may communicate over a network 340, such as the Internet or a private network (e.g., satellite, etc.). The feature input 312 may provide guidance for the system 320, e.g., constraints under which the system 320 operates. For example, if a plot is being generated, as shown, the feature input 312 may include a number of curves, curve shapes, value ranges for the plots, etc.

The object synthesis system 320 may implement embodiments of the method 200 discussed above. For example, the object synthesis system 320 may generate synthetic objects and associated labels 335 as pairs. The pairs may be stored in a database 330 of object and label pairs, providing a corpus of training data, as shown. The system 320 and/or 310 may communicate with the database 330 via the network 340.

In this embodiment, as shown, the system 320 may be configured to synthesize raster images of plot curves, and provide labels associated therewith. The plot curves may each include a table of coordinates, e.g., Cartesian coordinates, which may specify digital values represented by discrete locations on the curves. When used to train a machine learning model, the digitized data may be used to train the machine learning model to identify the curve and the values it represents.

Figure 4:
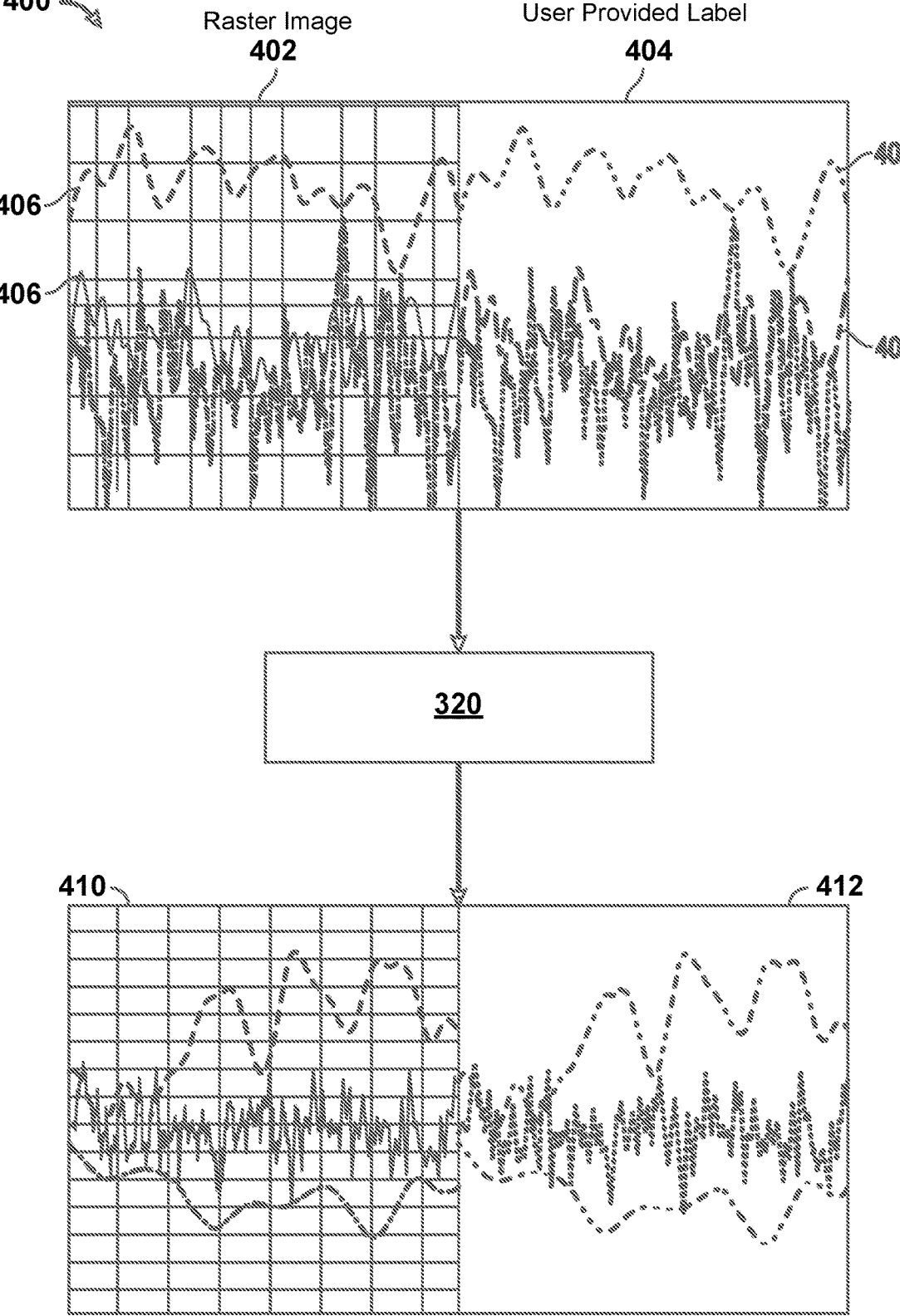
FIG. 4 illustrates input pairs of user-annotated raster images and labels, and synthetic raster images and labels generated using the method of FIG. 2 and the system of FIG. 3, according to an embodiment.

FIG. 4 illustrates a training pair 400 of a raster image 402 and a user-provided label 404, which can include a number of labels (e.g., one or more labels). As shown, the raster image 402 includes a plurality of curves 406 and noise. The curves 406 have different shapes, value ranges, numbers of curves, and line styles, which may be features of the object. In this embodiment, the noise, which can be non-signal noise, is shown in the form of gridlines. The gridlines, while useful for visual inspection of the curves by a human, may not be directly representative of any information recorded by the sensor, and thus may be filtered out or otherwise not labeled. In the manual case of the user-provided label 404, a user may trace the curves 406, which may provide the individual labels 408 associated with the curves 406.

A plurality of such pairs 400 may be provided to a deep learning network, e.g., the system 320, which may be trained from these images to synthesize additional curves 410 and label 412 pairings, thereby potentially multiplying the training data set, which may be employed to train a machine learning model to predict the labels based on the objects (raster images). As noted above, high-level feature input 312 may include for example, number of curves, curve shapes, value ranges for the plots, etc. These high-level features may act as constraints, within which the curves 406 may be varied, e.g., randomly, so as to produce multiple synthesized curves and labels.

Figure 5A:
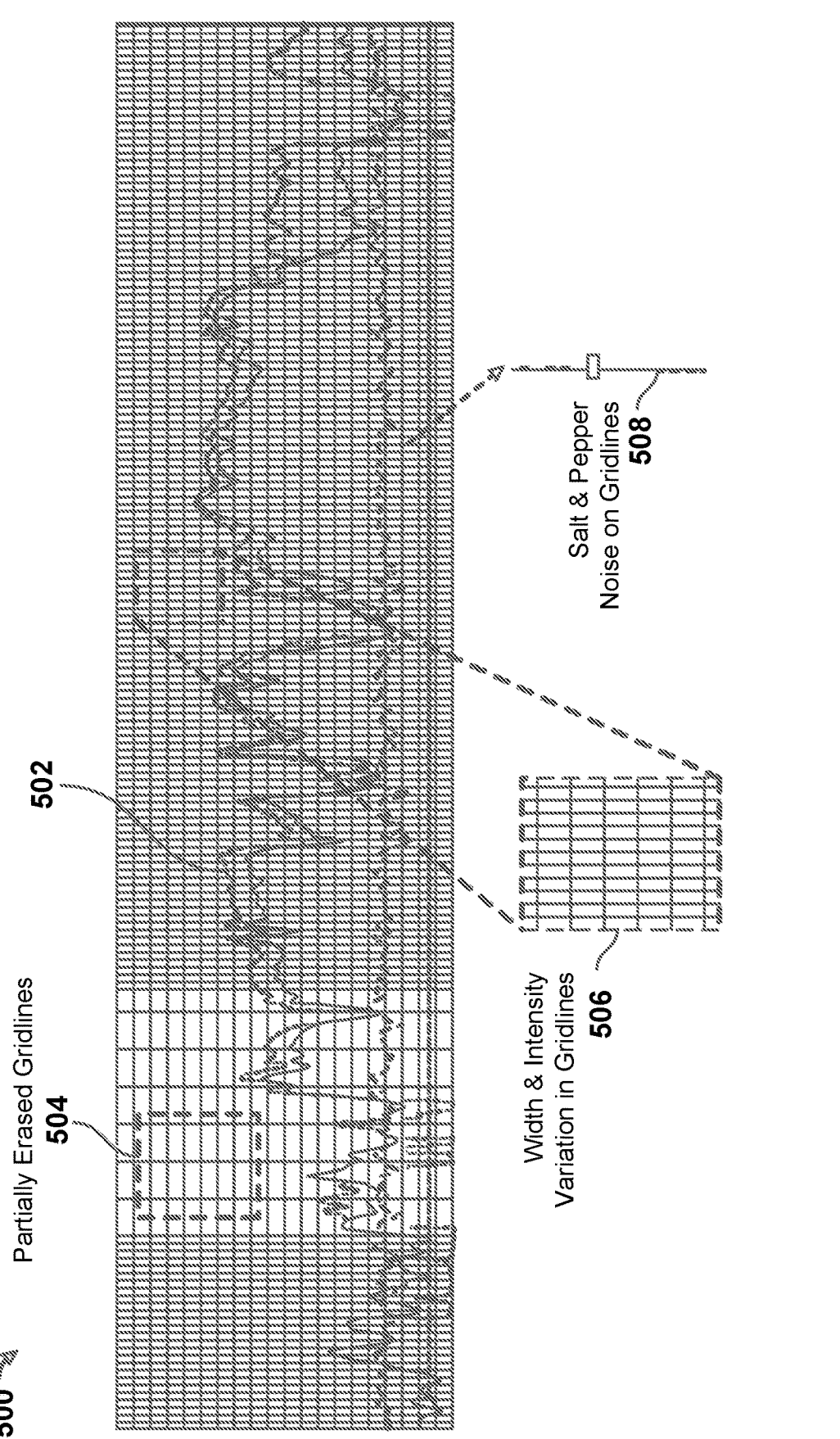
FIG. 5A and FIG. 5B illustrates a raster image of a plot having noise or "stochastic variation" therein, which may be injected into the synthetic objects, according to an embodiment.
Figure 5B:
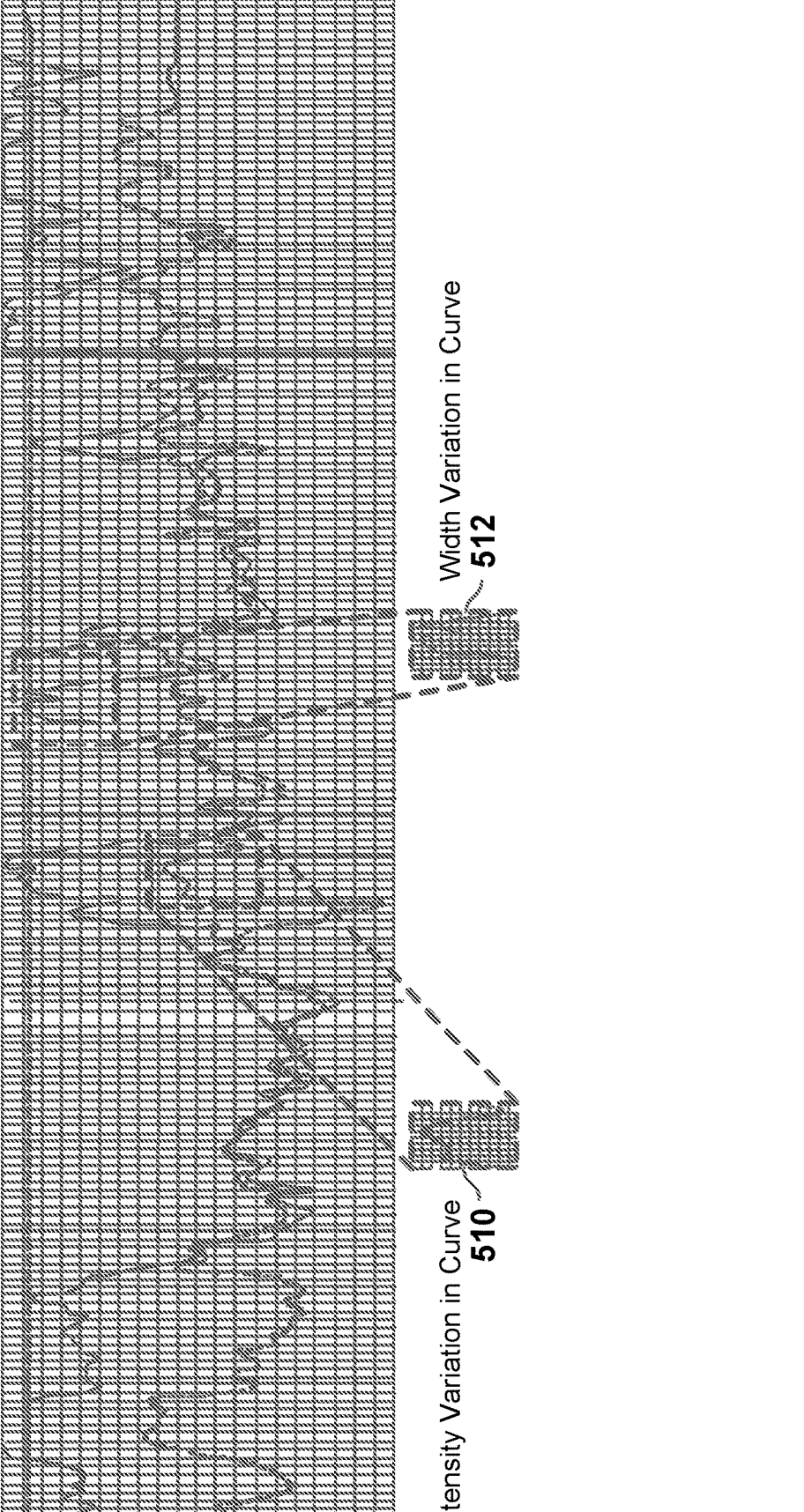

FIG. 5A and FIG. 5B illustrates an example of stochastic variation (e.g., noise) that may be part of objects (e.g., raster images), according to an embodiment. This noise, as mentioned above, may be synthetically generated and injected into the synthetic objects. The illustrations in FIG. 5A and FIG. 5B are specific to a plot 500 of a well log; however, it will be appreciated that the concept of injecting uncorrelated noise into a "signal" (data in an object) may apply to any sort of object.

In the illustrated embodiment, the plot 500 includes a plurality of curves 502. Several different (non-limiting examples of) types of noise are also present. As indicated at 504, partially erased gridlines can be present. Width and intensity variation in the gridlines 506 may be another form of noise. Salt and pepper noise on the gridlines 508 could be present. Further, the curves 502 can also carry noise in their signal, such as intensity variations 510 and width variations 512. Such noise may be produced as a function of the image having initially been printed, and then later optically scanned into digital format, and may thus be pervasive across different image-based data sets. Other, non-image stochastic variations (noise) can be present in text-based data sets, as well, as will be discussed in greater detail below; thus, the present discussion of image-based noise that is specific to plots and gridlines is merely an example.

Figure 6:
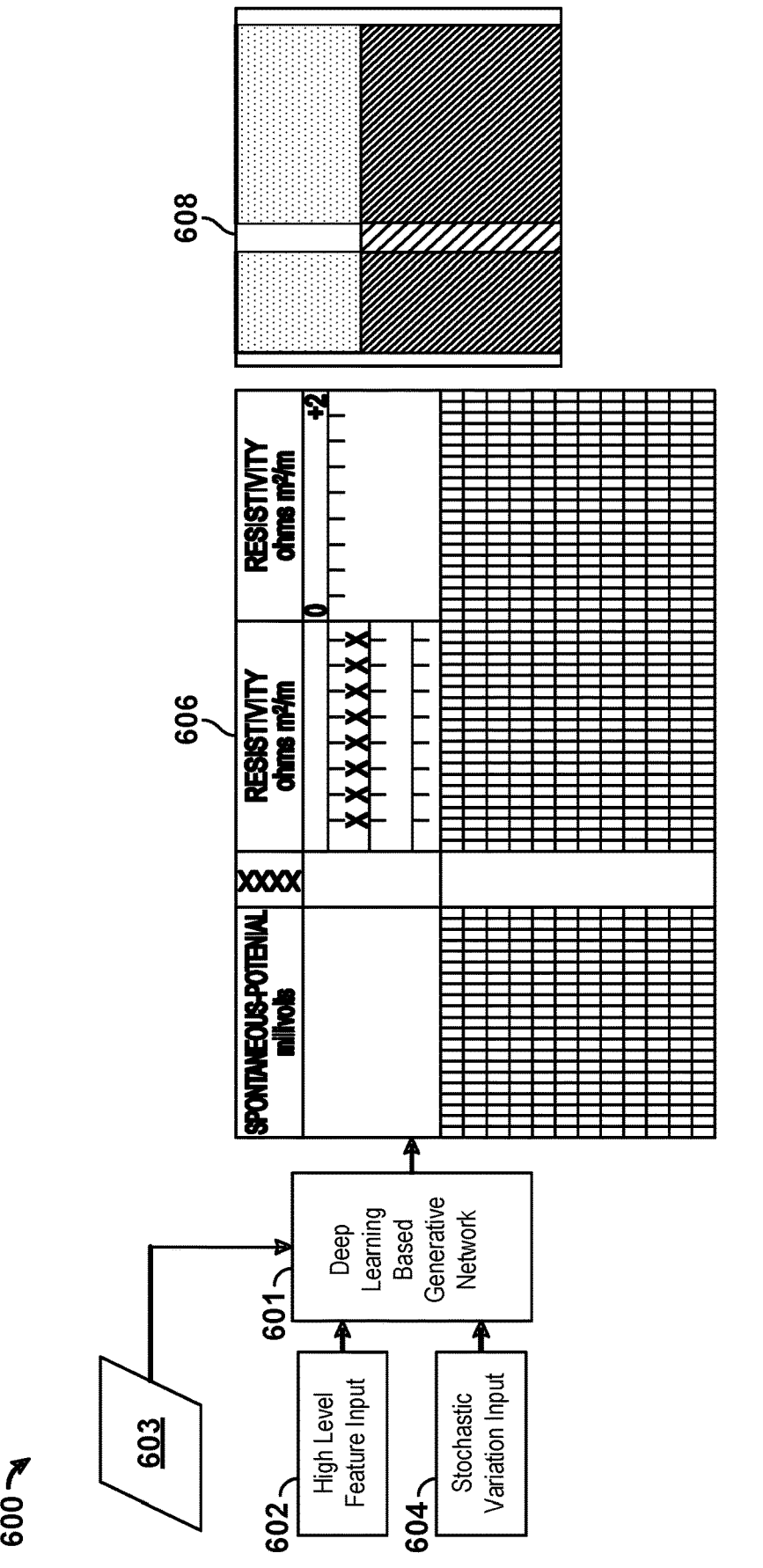
FIG. 6 illustrates a system for generating synthetic objects, specifically well logs, and masks that provide labels associated with the synthetic objects, according to an embodiment.

Referring now to FIG. 6, a system 600 is shown for synthesizing objects and labels, which may be similar to the system 300, according to an embodiment. In particular, the system 600 may be configured for generating synthetic well logs or seismic survey logs and associated labels, based on input objects 603, high-level feature input 602, and stochastic variation 604. The input objects 603 may be user-labeled (or otherwise pre-labeled) well logs or seismic surveys (e.g., objects of a same type as are to be synthesized).

Figure 7:
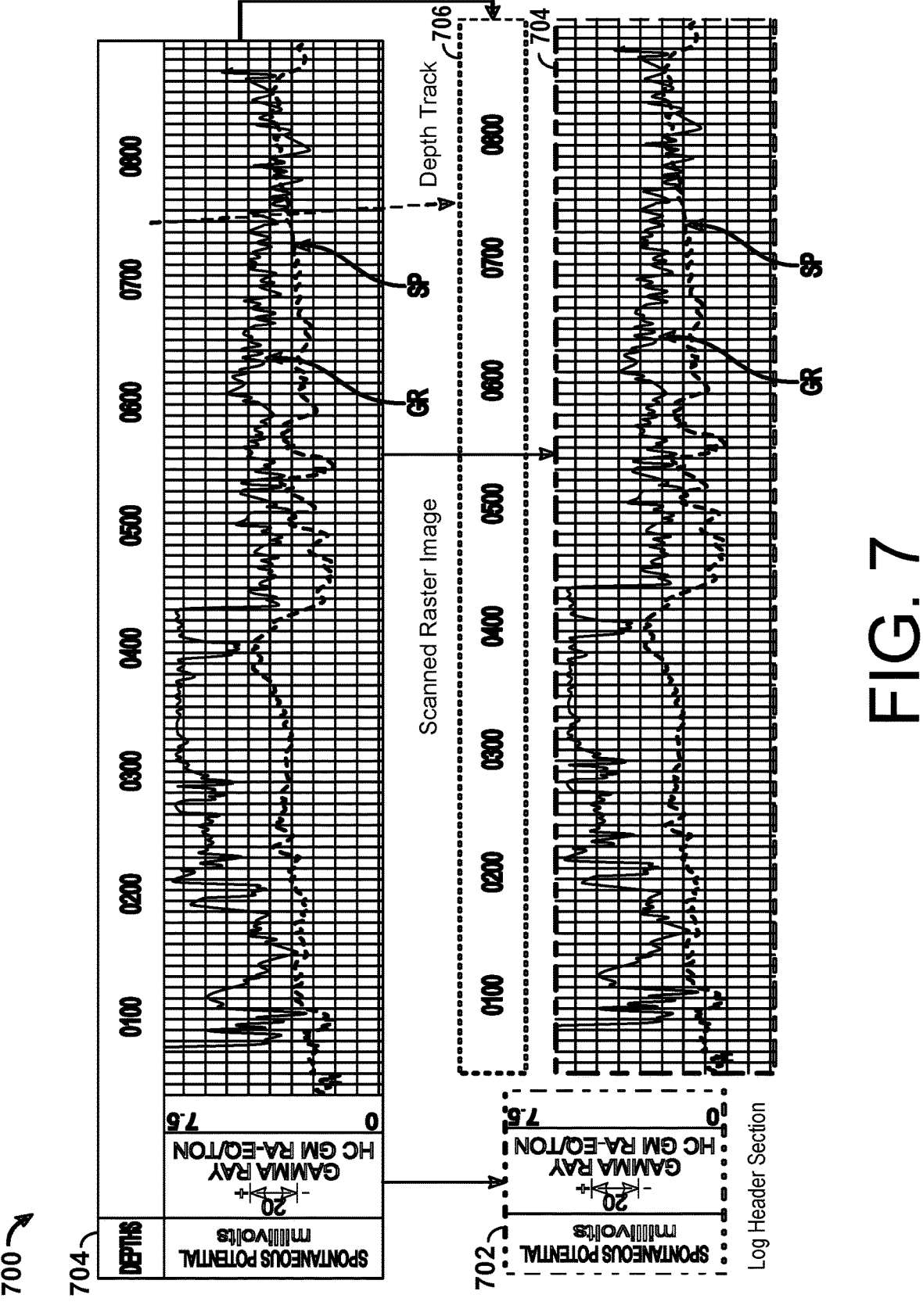
FIG. 7 illustrates a raster image of a well log including a log header section, a plot section, and a depth track, according to an embodiment.

FIG. 7 illustrates an example of such a well log 700, which may be in a portrait orientation (e.g., vertical) or in a landscape orientation (e.g., horizontal). As shown, the well log 700 may include sections, each providing different information. For example, the well log 700 may include a log header section 702, a plot section 704, and a depth track 706. The log header section 702 may provide a legend or key for understanding the curve found in the plot section 704. For example, the log header section 702 may specify information such as line type (e.g., dashes and dots) for the curve, data type (e.g., gamma ray), scale, type of sensed data (e.g., spontaneous-potential), units (e.g., millivolts), etc. The depth track 706 may specify an independent variable for the sensor readings recorded in the plot section 704; however, it will be recognized that the depth track 706 is just one example of an independent variable that may be produced as a feature along an X (or other independent variable) axis of a plot section 704 or another feature of an object.

Referring again to FIG. 6, the system 600 may include a deep learning generative network 601, or another type of machine learning model. The network 601 may receive the high-level feature input 602, the input objects 603, and the stochastic variation input 604. As noted above, the input raster images 603 may be pre-labeled with the location of log header sections, plot segments, and depth track, e.g., forming a "mask" that identifies where the sections of the well logs are relative to one another.

The high-level feature input 602 may be provided to the coarser layers of the network 601. The high-level feature input 602 may include the number and type of sections, such as sections 702-704, to be generated, along, potentially, with contents and/or relative positioning of the sections in the well logs to be synthesized. Further, the stochastic variation input may specify different types of single-channel, uncorrelated Gaussian input and may be provided to each level of the network 601.

The network 601 may output the synthetic pairs of objects and associated labels. For example, as shown, the synthetic object 606 is provided, along with a "mask" 608 that identifies the different sections (features) of the object 606. The mask 608 may be a representation of a data file that identifies the locations within the object 606. It will be appreciated that the relative location of the different segments itself may be a feature of the object, which may be adjusted or selected by the high-level input 602.

The network 601 may generate a multitude of slightly different synthetic objects 606 and masks 608 from the input, thereby providing a multiplier for the relatively few manually labeled input objects. The different synthetic objects 606 may, for example, also have uncorrelated stochastic variation or noise injected therein, as well as slightly different positioning and/or contents of the different segments. The variation provided by the network 601 may be a function of the variation of the input objects (e.g., raster images) and the labels applied thereto, with greater variation in the input objects leading potentially to greater variation in the synthetic objects 606. Accordingly, the network 601 may provide a robust training corpus from which to train a second machine learning model to predict masks from the unlabeled objects of similar content to the objects 606 and masks 608.

Figure 8:
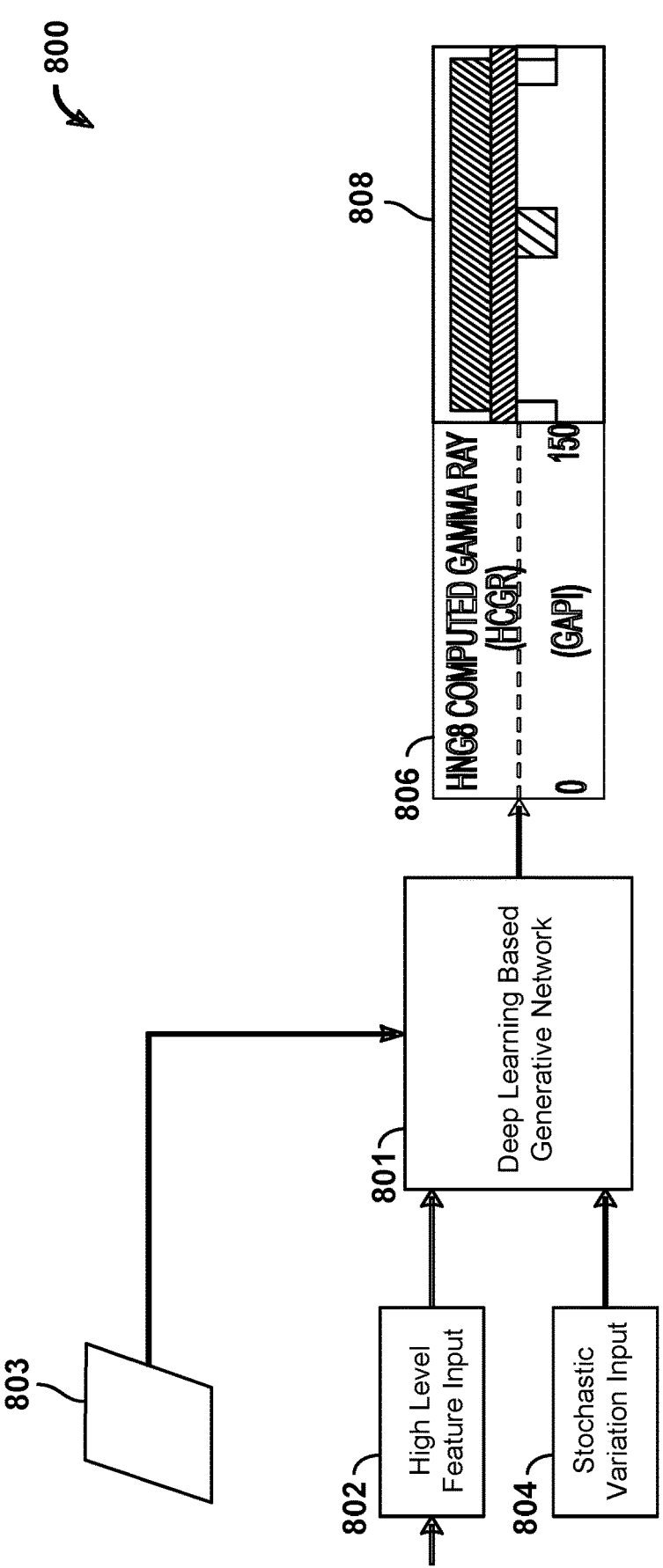
FIG. 8 illustrates a system for generating synthetic objects, specifically log header sections, and masks that provide labels associated with the data fields in the log header sections, according to an embodiment.

FIG. 8 illustrates a diagrammatic view of another system 800, according to an embodiment. The system 800 may be similar to the systems 300 and 600, and may be implemented in combination therewith. The system 800 may include a deep learning based generative network (or another machine learning model) 801 that is configured to synthesize log header sections 806 and masks 808 associated therewith. In order to do this, the network 801 may receive, as input, labeled log headers 803, high-level feature input 802, and stochastic variation input 804. The stochastic variation input 804 may be noise, similar to the image-based noise discussed above. The high-level feature input 802 may be provided to the coarser levels of the network 801, and the stochastic variation to each of the layers of the network 801.

Figure 9A:
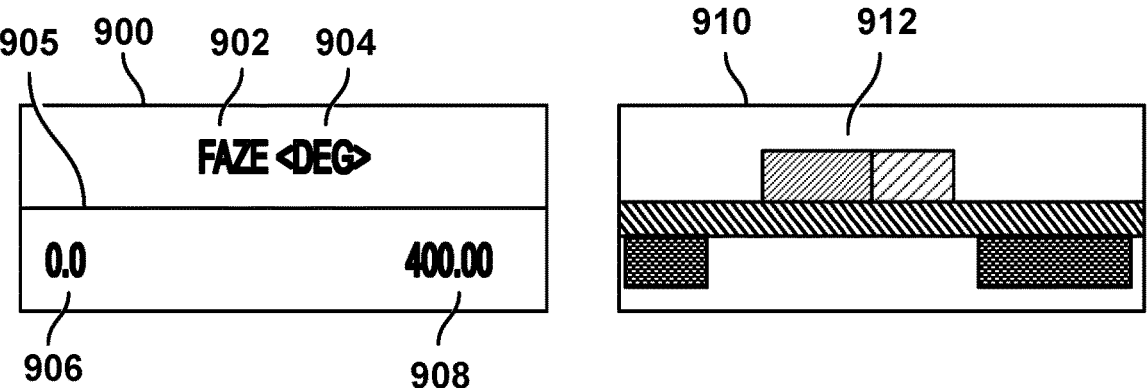
FIG. 9A and FIG. 9B illustrate two examples of log header sections and masks associated therewith and providing labels for the locations of the data fields in the log header sections.
Figure 9B:
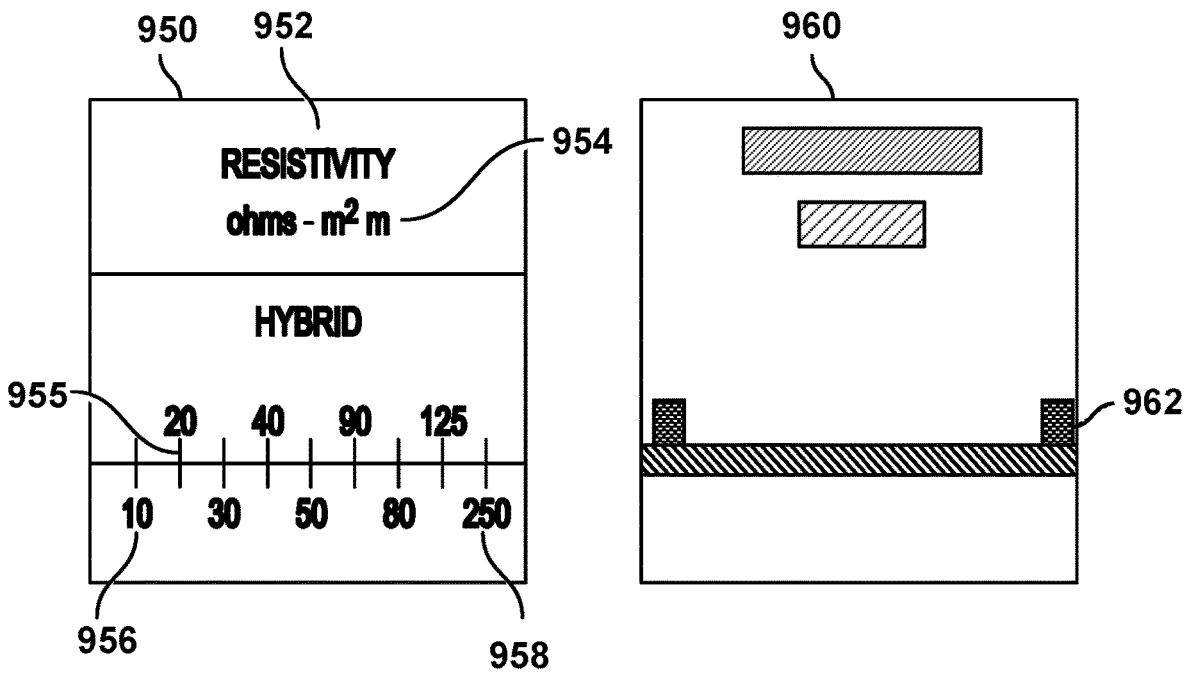

FIG. 9A and FIG. 9B illustrate two examples of log header sections 900, 950, respectively, and associated masks 910 and 960, respectively. The log header sections 900 and 950 may each include data fields. For example, the log header section 900 may include a type of measurement 902, a unit 904, a line type 905, a lower value range 906, and an upper value range 908. Similarly, the log header section 950 may include data fields for type of measurement 952, units 954, lower value range 955, upper value range 956, and line type 958.

The masks 910 and 960 may include labels for the location of the different data fields in the log header sections 900 and 950. For example, label 912 represents the location of the type of measurement 902 of the log header section 900, while the label 962 represents the location of the upper value range 956.

Comparing the log header sections 900 and 950, it can be seen that the relative positioning, font, style, and other aspects of the different data fields can vary, and thus training a machine learning model to accurately predict masks 910 and 960 can be challenging. Accordingly, different types of log headers, with different data field arrangements, different data field contents, etc., can be provided to train a machine learning model to predict the masks 910 and 960. In order to do so, multiple variations of each type of log header section can be synthesized, along with labels, by a system such as, for example, the system 800. These variations can include changes in position, style, and contents of the individual data fields, for example, along with noise (stochastic variation) injected therein.

Thus, referring back to FIG. 8, the high-level feature input can specify the data fields to be included (e.g., the data fields

902 to 908 and/or 952 to 958 discussed above). Accordingly, in combination with the training objects/labels received as input 803, and the stochastic variation, the network 801 can produce multiple different objects 806 and masks 808.

It will be appreciated that the image-based raster training systems and methods discussed herein can be used together. For example, a machine learning model may be trained, using the synthesized objects, to parse a well log into its sections (e.g., identify labels), including at least one log header and at least one plot section. The machine learning model may also be trained to parse the data fields of the log header, and to determine the plotted curves (and values associated therewith) in the curve sections.

Figure 10:
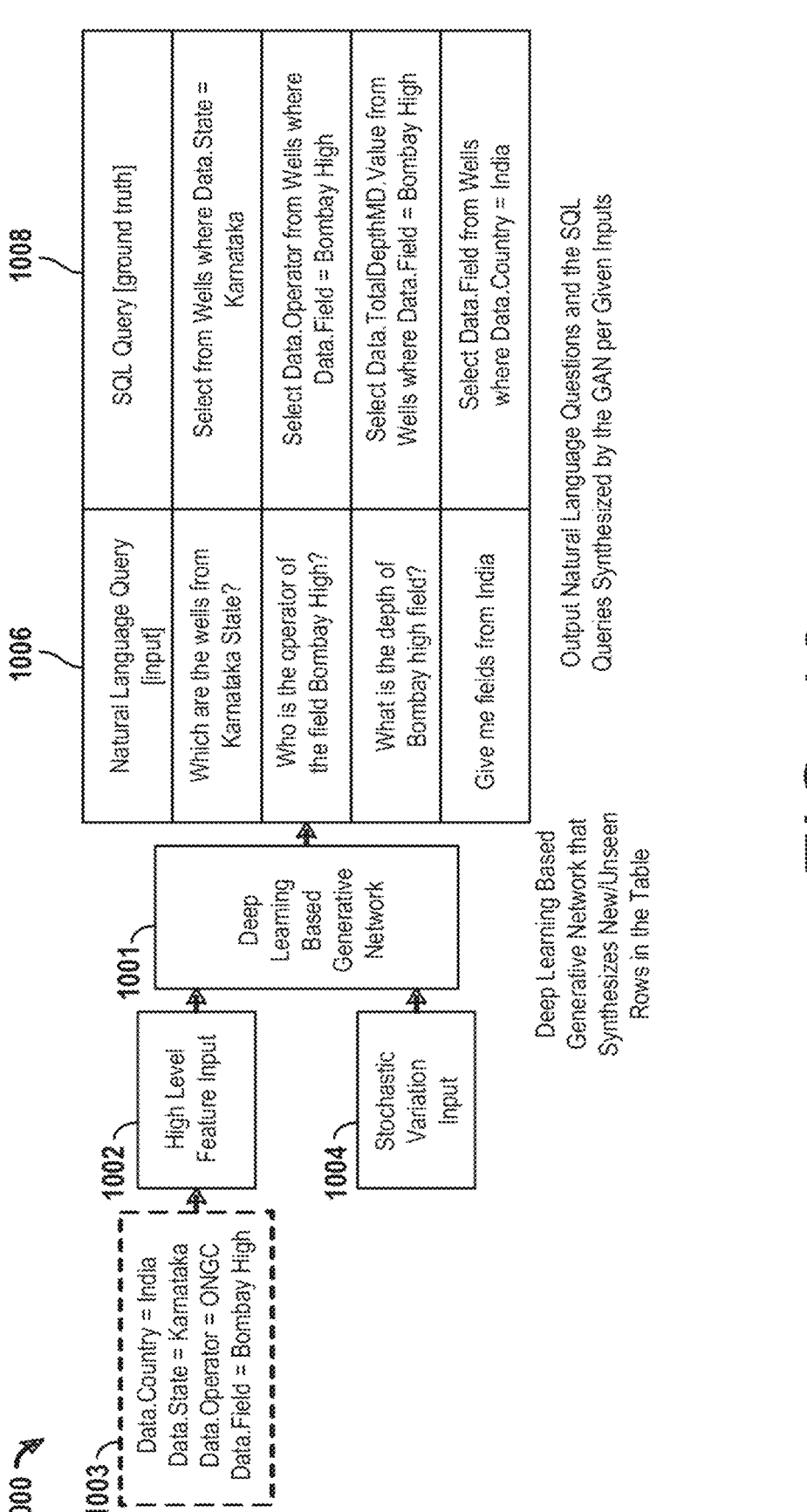
FIG. 10 illustrates a system for generating synthetic objects, specifically natural language queries and database language queries associated therewith, according to an embodiment.

FIG. 10 illustrates a diagrammatic view of a system 1000 for synthesizing training data, according to an embodiment. The system 1000 may be similar to the systems 300, 600, 800 discussed above. The system 1000 may, for example, be configured to predict database queries (e.g., in SQL or another database language) from natural language queries. For example, input 1003 in the form of combinations of natural language queries (objects) and associated database queries (labels). High-level feature input 1002 may also be provided, e.g., country, state, and/or operator. Stochastic variation input 1004 may also be provided. In this embodiment, stochastic variation input 1004 may be related to grammatical inconsistencies as between human users. For example, different prepositions, verbs, or other parts of speech may be used by different people, and at times grammatically incorrect usage may be employed. Further, word choices made by different people may vary (e.g., synonyms may be available), although the meaning may be the same. The stochastic variation input 1004 may capture such variation, so that the machine learning model may be capable of accounting for it.

A deep learning based generative network 1001 may receive input and generate pairs of natural language queries 1006 and database queries 1008. For example, the network 1001 may be configured to vary the natural language queries and provide, as a label, an associated database query as a ground truth. Specifically, the same query may be asked in different ways. For example, the query "Who is the operator of well XYZ?" may mean the same thing as "Who operates well XYZ?"; "Which operator operates well XYZ?"; "Show me the operator of well XYZ"; "Find me the operator of well XYZ"; "Provide me with the name of operator for well XYZ"; "Can you provide me the operator of well XYZ?"; and "Please give me the name of operator of well XYZ." Thus, a same label may be given to each of these queries and may then be provided as training pairs to a machine learning model that is trained to predict database queries from natural language queries.

Figure 11:
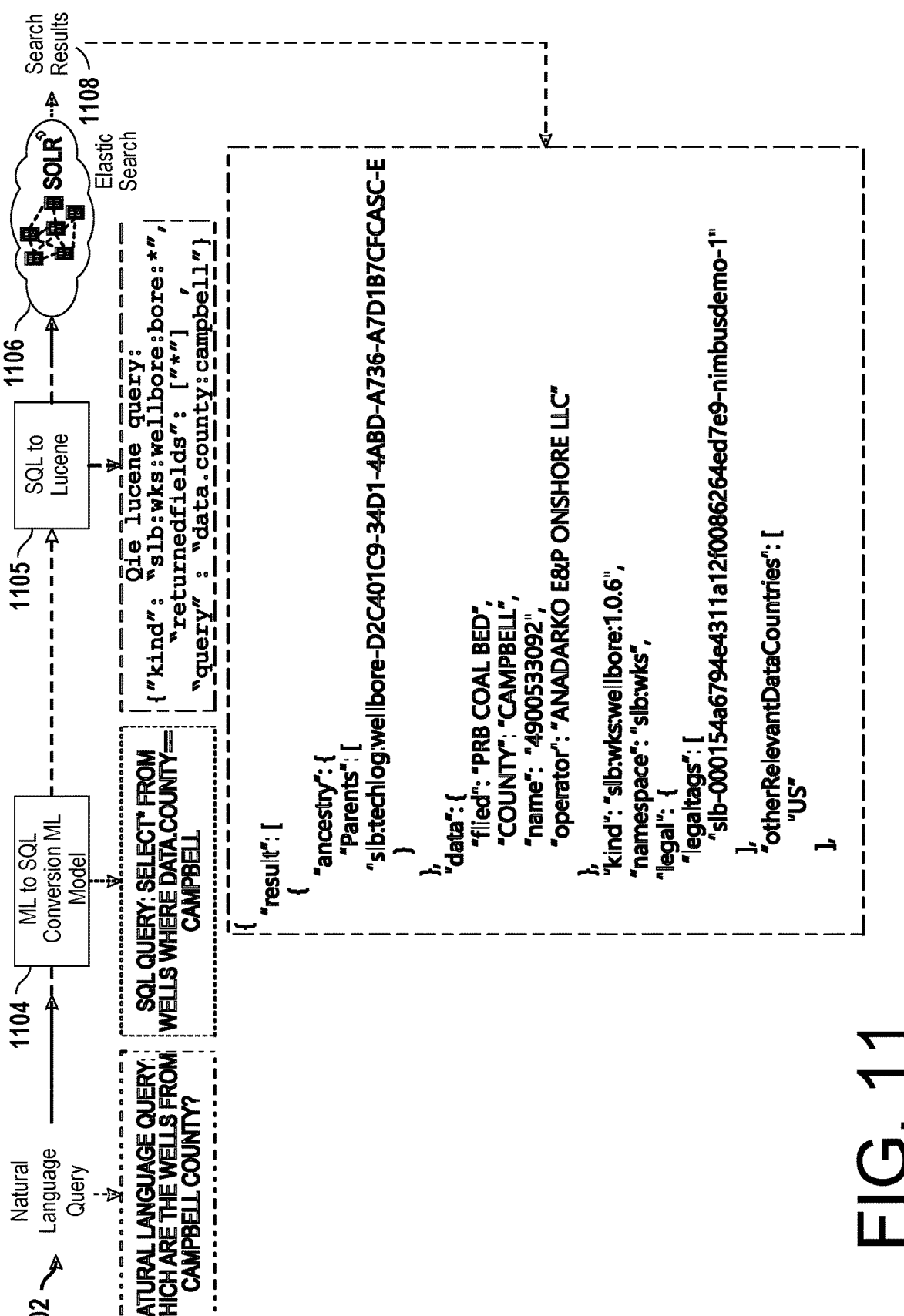
FIG. 11 illustrates a workflow for predicting database queries based on natural language queries, according to an embodiment.

FIG. 11 illustrates a diagrammatic view of an implementation of a machine learning model to predict database queries, according to an embodiment. The machine learning model implemented as part of FIG. 11 may have been trained using the natural language query and database query pairs synthesized by the system 1000 of FIG. 10.

As shown, a natural language query may be received at 1102. The natural language query may be converted to a first database language (SQL) query using the trained machine learning model 1104. The first database language query may then be converted to a second, more specific, e.g., oilfield-use, database language query at 1105. For example, transformer-based encoder-decoder architectures may be used to train the natural language to SQL query association. For example, BERT based models may be trained to answer questions from a paragraph/document. The second database language may be configured to query databases with specific fields relevant to oilfield information, such as operator-specific data. An elastic search 1106 may then be performed, and search results 1108 returned.

Figure 12:
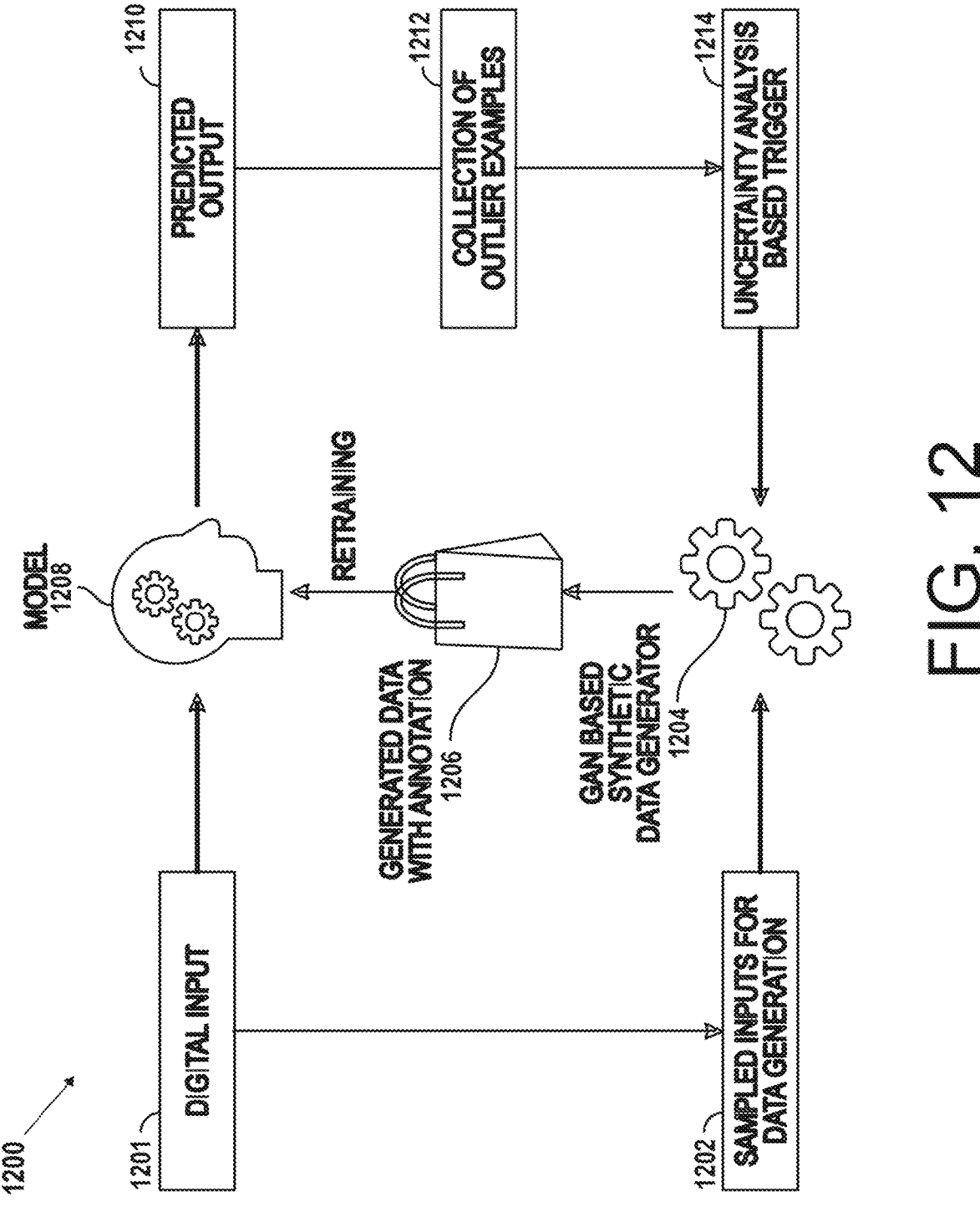
FIG. 12 illustrates a workflow for automatically identifying when to retrain a machine learning model, including generating new synthetic objects and labels, according to an embodiment.

FIG. 12 illustrates a workflow 1200 that implements one or more embodiments of the systems described above. For example, the workflow 1200 may provide for automatic updating of the machine learning models used to predict labels for features of objects, based at least in part on training pairs of objects and labels generated using a machine learning model.

The workflow 1200 may include receiving digital input 1201. A human user may review a fraction of the data input as "sampled" data input 1202, which may be used for data generation. These may be the training pairs of object and labels, as well as high-level inputs setting parameters for synthetic object/label generation, and stochastic variation. The sampled inputs 1202 may then be provided to a first machine learning model 1204. The first machine learning model 1204 may implement one or more of the deep learning networks discussed above, and may generate the synthetic object/label pairs 1206. In particular, the objects may have features, which are identified by labels as ground truths. The features are variations of the features of the sampled input, which may be representative of at least a portion of the non-sampled portions of the digital input 1201.

In the example of FIG. 12, the first machine learning model 1204 is shown as being a generative adversarial network (GAN) synthetic data generator. GANs are implicit generative models, which means that they do not explicitly model the likelihood function nor provide a means for finding the latent variable corresponding to a given sample, unlike alternatives such as flow-based generative model. As to operational components of a GAN, a generative network generates candidates while a discriminative network evaluates them. A contest operates in terms of data distributions. For example, a generative network can learn to map from a latent space to a data distribution of interest, while a discriminative network can distinguish candidates produced by the generator from the true data distribution. A generative network's training objective can be to increase the error rate of the discriminative network (e.g., to trick the discriminator network by producing novel candidates that the discriminator thinks are not synthesized (e.g., thinks are part of the true data distribution)).

A known dataset can serve as initial training data for a discriminator. Training can involve presenting it with samples from the training dataset until it achieves acceptable accuracy. The generator can be trained based on whether it succeeds in fooling the discriminator. As an example, a generator may be seeded with randomized input that is sampled from a predefined latent space (e.g. a multivariate normal distribution). Thereafter, candidates synthesized by the generator can be evaluated by the discriminator. As an example, one or more independent backpropagation procedures may be applied to both networks so that the generator produces better samples, while the discriminator becomes more skilled at flagging synthetic samples. When used for image generation, a generator may be or include a deconvolutional neural network, and a discriminator may be or include a convolutional neural network.

As explained, a GAN architecture is an approach to training a model for image synthesis that can include two models: a generator model and a discriminator model. The generator takes a point from a latent space as input and generates new plausible images from the domain, and the discriminator takes an image as input and predicts whether it is real (from a dataset) or fake (generated). Both models can be trained in a game, such that the generator is updated to better fool the discriminator and the discriminator is updated to better detect generated images.

A CycleGAN is an extension of the GAN architecture that involves the simultaneous training of two generator models and two discriminator models. As an example, a system may utilize a CycleGAN. In a CycleGAN, one generator takes images from the first domain as input and outputs images for the second domain, and the other generator takes images from the second domain as input and generates images for the first domain. Discriminator models are then used to determine how plausible the generated images are and update the generator models accordingly. This extension alone might be enough to generate plausible images in each domain, but may not be sufficient to generate translations of the input images. A CycleGAN can use an additional extension to the architecture called cycle consistency whereby an image output by the first generator could be used as input to the second generator and the output of the second generator should match the original image. The reverse is also possible: that an output from the second generator can be fed as input to the first generator and the result should match the input to the second generator. Cycle consistency is a concept from machine translation where, for example, a phrase translated from English to French should translate from French back to English and be identical to the original phrase; noting that the reverse process is also to be valid.

A CycleGAN approach encourages cycle consistency by adding an additional loss to measure the difference between the generated output of the second generator and the original image, and the reverse. This acts as a regularization of the generator models, guiding the image generation process in the new domain toward image translation.

As an example, a conditional GAN (cGAN) architecture may be utilized. As an example, in a cGAN, image generation can be conditional on a class label, if available, allowing targeted generation of images of a given type. Where generator and discriminator models are conditioned on a class label, a trained generator model can be used as a standalone model to generate images in a domain where images of a given type, or class label, can be generated.

As an example, a cGAN can be trained to map edges to photo images. In such an example, a discriminator, D, learns to classify between fake (synthesized by a generator, G) and real (edge, photo) tuples. In such an approach, a generator, G, learns to fool the discriminator, D. Unlike an unconditional GAN, the generator, G, and the discriminator, D, can observe an input edge map.

As explained, an ordinary GAN may learn a mapping from a random noise vector z to an output image y, $G: z \rightarrow y$; whereas, a cGAN can learn a mapping from an observed image x and a random noise vector z, to y, $G: \{x, z\} \rightarrow y$. As noted, a cGAN involves learning a mapping using an observed image x, and a random noise vector z, to an output image y. In such an approach, the generator G can be trained to produce outputs that are to some degree indistinguishable from real inputs via an adversarially trained discriminator D, which is trained to do as well as possible at detecting generator generated fakes. Consider training a cGAN to map edges to a photographic image. In such an example, the discriminator D learns to classify between fake (e.g., $G(x)$) and real {edge, photo} tuples. The generator G learns to fool the discriminator D. As an example, a generator network and a discriminator network can observe the input, which in the foregoing example, can be an input edge map.

Referring again to FIG. 12, the training pairs 1206 may be supplied to a second machine learning model 1208. The second machine learning model 1208 may thus be trained to predict labels of the features of the objects, based on the training pairs 1206. The remaining, non-sampled portions of the digital input 1201 may then be provided to the second machine learning model 1208, which may proceed with the prediction of the labels 1210 associated with the objects of the digital input 1201.

In some embodiments, an uncertainty of the predictions 1210 may be calculated, or otherwise, outliers may be collected at 1212. An outlier may be a predicted label that does not match other labels, or for which label data is missing or null. For example, considering a log header section such as the log header section 900 of FIG. 9A, one or more different log header arrangements (e.g., with one of the sections omitted or in an unexpected location) may be included in the digital input 1201 that was not sampled, and thus not employed to train the second machine learning model 1208. Thus, the mask 910 produced by the second machine learning model 1208 may include unexpected fields, data fields that are empty, or filled with unexpected data. Thus, the results of the prediction 1210 can be compared, and if a certain (e.g., predetermined or statistically determined) number of outliers are recorded, or a certain (e.g., predetermined or statistically determined) uncertainty threshold is met, the system 1214 may trigger or otherwise flag the data as calling for a retraining of second machine learning model.

The outliers may be provided to a user, and the user may manually label the outliers and/or other digital data samples, which may then be provided as sample inputs 1202, from which synthetic training data may be generated and used to retrain the second machine learning model. In such an approach, some amount of manual labeling may be employed that may have a substantial effect on operations as the labeling can be for particular instances where improved training through use of labels can result in fewer outliers.

FIG. 13 shows an example of a method 1300 and an example of a system 1390. In the example of FIG. 13, the method 1300 can include a reception block 1310 for receiving a labeled object having a feature and an assigned label that represents the feature; a reception block 1320 for receiving stochastic variation input; a training block 1330 for training a first machine learning system to generate a synthetic object based at least in part on the feature and the stochastic variation input; a generation block 1340 for generating a plurality of synthetic objects and associated labels using the trained first machine learning system; a training block 1350 for training a second machine learning model to predict labels for features of objects based at least in part on the plurality of synthetic objects and associated labels; and a prediction block 1360 for predicting a label for an unlabeled feature of an object using the second machine learning model.

As an example, the method 1300 of FIG. 13 can include generating a plurality of synthetic objects and associated labels using a trained first machine learning system as in the generation block 1340, where the trained first machine learning system is trained to generate a synthetic object based at least in part on a feature of a labeled object, an assigned label that represents the feature, and stochastic variation input, for example, as in the reception block 1310, the reception block 1320 and the training block 1330. Such a method can further include training a second machine learning model to predict labels for features of objects based at least in part on the plurality of synthetic objects and associated labels per the training block 1350; and, for example, optionally predicting a label for an unlabeled feature of an object using the second machine learning model per the prediction block 1360.

In the example of FIG. 13, the system 1390 includes one or more information storage devices 1391, one or more computers 1392, one or more networks 1395, and instructions 1396. As to the one or more computers 1392, each computer may include one or more processors (e.g., or processing cores) 1393, and memory 1394 for storing the instructions 1396, for example, executable by at least one of the one or more processors. As an example, a computer may include one or more network interfaces (e.g., wired or wireless), one or more graphics cards, a display interface (e.g., wired or wireless), etc.

The method 1300 is shown along with various computer-readable media blocks 1311, 1321, 1331, 1341, 1351, and 1361 (e.g., CRM blocks). Such blocks may be utilized to perform one or more actions of the method 1300. For example, consider the system 1390 of FIG. 13 and the instructions 1396, which may include instructions of one or more of the CRM blocks 1311, 1321, 1331, 1341, 1351, and 1361.

As an example, one or more machine learning techniques may be utilized to enhance process operations, a process operations environment, a communications framework, etc. As explained, various types of information can be generated via operations where such information may be utilized for training one or more types of machine learning models to generate one or more trained machine learning models, which may be deployed within one or more frameworks, environments, etc.

As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine learning model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUS)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, synthetic data generation, prediction, etc., on multiple platforms.

As an example, a method can include generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

As an example, a method can include receiving a labeled object having a feature and an assigned label that represents the feature; receiving stochastic variation input; training a first machine learning system to generate a synthetic object based at least in part on the feature and the stochastic variation input; generating a plurality of synthetic objects and associated labels using the trained first machine learning system; training a second machine learning model to predict labels for features of objects based at least in part on the plurality of synthetic objects and associated labels; and predicting a label for an unlabeled feature of an object using the second machine learning model.

As an example, such a method may further include determining an uncertainty associated with labeling the unlabeled feature in the object using the trained second machine learning model; determining that the uncertainty is greater than a predetermined value; in response to determining that the uncertainty is greater than the predetermined value, soliciting an input of one or more training pairs of objects having the unlabeled feature of the object and an assigned label associated therewith; generating a new plurality of synthetic objects and associated labels using the trained first machine learning system and the one or more training pairs of objects; and training the second machine learning model to predict labels for features of objects based at least in part on the plurality of new synthetic objects and associated labels.

As an example, synthetic objects can include a stochastic variation output, where the stochastic variation input includes single channel images including uncorrelated Gaussian noise, and where the stochastic variation output includes one or more of: erased or partially erased gridlines; width and intensity variations in the gridlines; noise on the gridlines; intensity variation in curves; and width variation in the curves.

As an example, a labeled object can include a well log, where a feature includes one or more of a header section, a depth track, and a plot segment, and where training a first machine learning model includes training the first machine learning model to generate synthetic objects having variations of the one or more of the header section, the depth track, and the plot based on the labeled object. In such an example, the variations can include different relative locations for one or more of the header section, the depth track, and the plot segment in the individual synthetic objects.

As an example, a labeled object can include a plot of a well log or a seismic survey log, where a feature includes one or more of a curve shape, a number of curves, a range of values, and a line style, and where training a first machine learning model includes training the first machine learning model to generate synthetic objects having variations of the one or more of the curve shape, the number of curves, the range of values, and the line style.

As an example, a labeled object can include a header section of a well log, where a feature includes a line style, units, or a scale in the header section, and where training a first machine learning model includes training the first machine learning model to generate synthetic objects having variations of the one or more of the line style, the units, or the scale. In such an example, the variations can include different relative locations for display of the line style, the units, or the scale in the individual synthetic objects.

As an example, a labeled object can include a natural language search query, where a feature includes one or more of a country, a state, an operator identity, and a field need, and where training a first machine learning model includes training the first machine learning model to generate synthetic objects having variations of the one or more of the country, the state, the operator, and the field need, and where training a second machine learning model includes training the second machine learning model to label natural language search queries as database-specific language search queries.

As an example, a first machine learning system can include a generative adversarial network. In such an example, the generative adversarial network can include a generator and a discriminator and may include more than one generator and/or more than one discriminator.

As an example, an architecture of a first machine learning system may differ from an architecture of a second machine learning system.

As an example, a labeled object may be manually labeled. For example, consider a framework that can render a GUI to a display where a user can interact with the framework to assign a label to a feature. In such an example, the GUI may provide a menu that can include predefined labels where a user can utilize one of the predefined labels or, for example, a GUI may provide for generation of a new type of label or labels.

As an example, a non-transitory, computer-readable medium storing instructions that, when executed by at least one processor of a computing system, can cause the computing system to perform operations, where the operations include: generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

As an example, a non-transitory, computer-readable medium storing instructions that, when executed by at least one processor of a computing system, can cause the computing system to perform operations, where the operations include: receiving a labeled object having a feature and an assigned label that represents the feature; receiving stochastic variation input; training a first machine learning system to generate a synthetic object based at least in part on the feature and the stochastic variation input; generating a plurality of synthetic objects and associated labels using the trained first machine learning system; training a second machine learning model to predict labels for features of objects based at least in part on the plurality of synthetic objects and associated labels; and predicting a label for an unlabeled feature of an object using the second machine learning model.

As an example, a computing system can include one or more processors; and a memory system including one or more non-transitory computer-readable media storing instructions that, when executed by at least one of the one or more processors, cause the computing system to perform operations, where the operations can include: generating a plurality of synthetic objects and associated labels using a trained first machine learning system that is trained to generate a synthetic object based at least in part on a feature of a labeled object, an assigned label that represents the feature, and stochastic variation input; training a second machine learning model to predict labels for features of objects based at least in part on the plurality of synthetic objects and associated labels; and predicting a label for an unlabeled feature of an object using the second machine learning model.

As an example, a computing system can include one or more processors; and a memory system including one or more non-transitory computer-readable media storing instructions that, when executed by at least one of the one or more processors, cause the computing system to perform operations, where the operations can include: receiving a labeled object having a feature and an assigned label that represents the feature; receiving stochastic variation input; training a first machine learning system to generate a synthetic object based at least in part on the feature and the stochastic variation input; generating a plurality of synthetic objects and associated labels using the trained first machine learning system; training a second machine learning model to predict labels for features of objects based at least in part on the plurality of synthetic objects and associated labels; and predicting a label for an unlabeled feature of an object using the second machine learning model.

As an example, a computer program product can include one or more computer-readable storage media that can include processor-executable instructions to instruct a computing system to perform one or more methods and/or one or more portions of a method.

Figure 14:
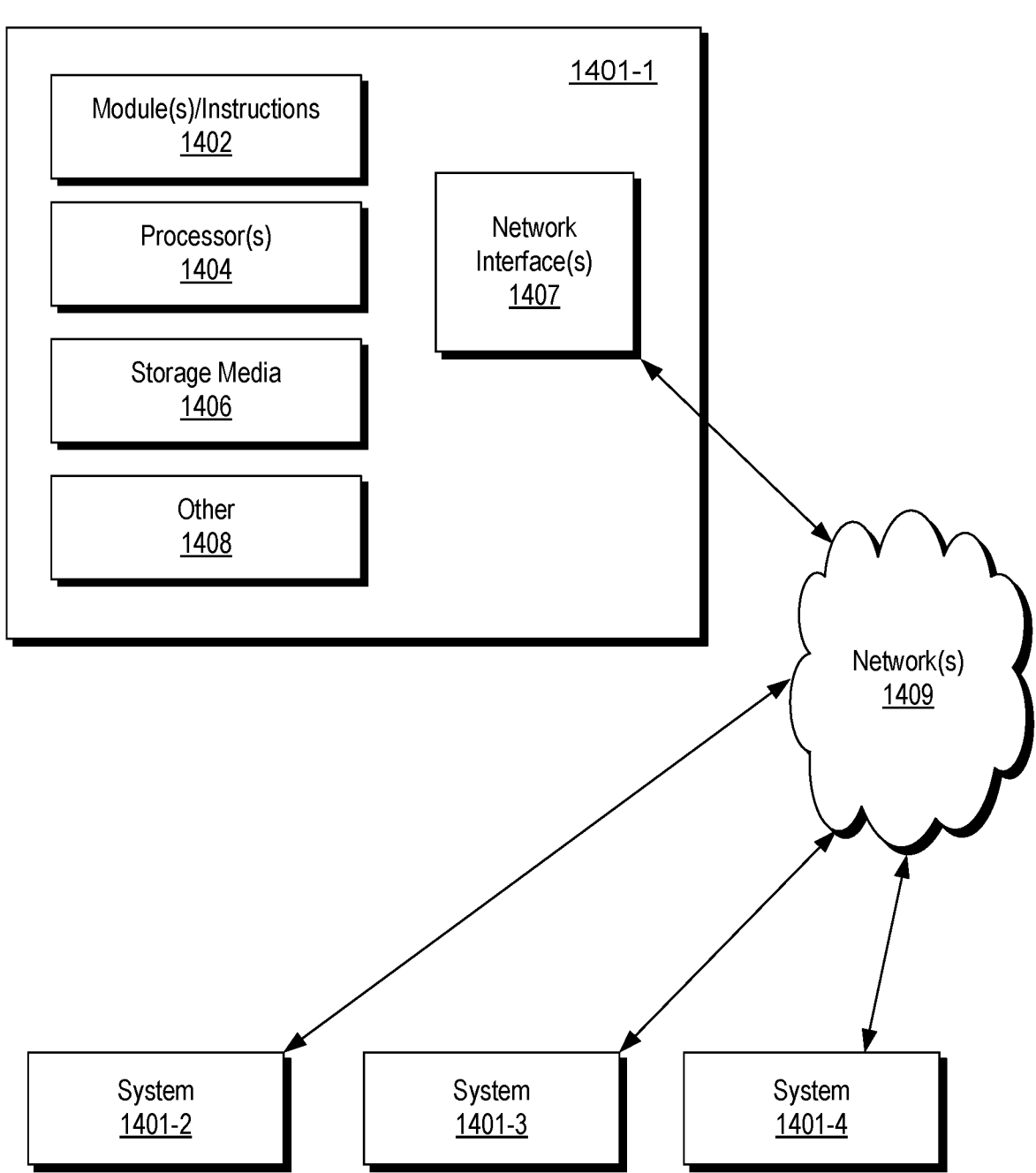
FIG. 14 illustrates a schematic view of a computing system, according to an embodiment.

In some embodiments, a method or methods may be executed by a computing system. FIG. 14 shows an example of a system 1400 that can include one or more computing systems 1401-1, 1401-2, 1401-3 and 1401-4, which may be operatively coupled via one or more networks 1409, which may include wired and/or wireless networks.

As an example, a system can include an individual computer system or an arrangement of distributed computer systems. In the example of FIG. 14, the computer system 1401-1 can include one or more modules 1402, which may be or include processor-executable instructions, for example, executable to perform various tasks (e.g., receiving information, requesting information, processing information, simulation, outputting information, etc.).

As an example, a module may be executed independently, or in coordination with, one or more processors 1404, which is (or are) operatively coupled to one or more storage media 1406 (e.g., via wire, wirelessly, etc.). As an example, one or more of the one or more processors 1404 can be operatively coupled to at least one of one or more network interface 1407. In such an example, the computer system 1401-1 can transmit and/or receive information, for example, via the one or more networks 1409 (e.g., consider one or more of the Internet, a private network, a cellular network, a satellite network, etc.). As shown, one or more other components 1408 can be included.

As an example, the computer system 1401-1 may receive from and/or transmit information to one or more other devices, which may be or include, for example, one or more of the computer systems 1401-2, etc. A device may be located in a physical location that differs from that of the computer system 1401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

In some embodiments, computing system 1400 can include one or more raster digitization module(s) as other components 1408. In the example of computing system 1400 includes the raster digitization module as at least some of the other components 1408. In some embodiments, a single raster digitization module 1408 may be used to perform some aspects of one or more embodiments of the methods disclosed herein. In other embodiments, a plurality of raster digitization modules 1408 may be used to perform some aspects of methods herein.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 1400, FIG. 14), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principles of the disclosure and its practical applications, to thereby enable others skilled in the art to best utilize the disclosed embodiments and various embodiments with various modifications as are suited to the particular use contemplated.

What is claimed is:

1. A method comprising:
generating a plurality of synthetic objects and associated labels using a trained first machine learning system that is trained to generate a synthetic object based at least in part on a feature of a labeled object, an assigned label that represents the feature, and stochastic variation input, wherein the synthetic objects include a stochastic variation output, wherein the stochastic variation input comprises single channel images including uncorrelated Gaussian noise, and wherein the stochastic variation output comprises one or more of:
erased or partially erased gridlines;
width and intensity variations in the gridlines;
noise on the gridlines;
intensity variation in curves; and
width variation in the curves;
training a second machine learning model to predict labels for features of objects based at least in part on the plurality of synthetic objects and associated labels; and
predicting a label for an unlabeled feature of an object using the second machine learning model.

2. The method of claim 1, further comprising:
determining an uncertainty associated with labeling the unlabeled feature in the object using the trained second machine learning model;
determining that the uncertainty is greater than a predetermined value;
in response to determining that the uncertainty is greater than the predetermined value, soliciting an input of one or more training pairs of objects having the unlabeled feature of the object and an assigned label associated therewith;
generating a new plurality of synthetic objects and associated labels using the trained first machine learning system and the one or more training pairs of objects; and
training the second machine learning model to predict labels for features of objects based at least in part on the plurality of new synthetic objects and associated labels.

3. The method of claim 1, wherein the labeled object comprises a well log, wherein the feature comprises one or more of a header section, a depth track, and a plot segment, and wherein training the first machine learning model comprises training the first machine learning model to generate synthetic objects having variations of the one or more of the header section, the depth track, and the plot segment based on the labeled object.

4. The method of claim 3, wherein the variations include different relative locations for one or more of the header section, the depth track, and the plot segment in the individual synthetic objects.

5. The method of claim 1, wherein the labeled object comprises a plot of a well log or a seismic survey log, wherein the feature comprises one or more of a curve shape, a number of curves, a range of values, and a line style, and wherein training the first machine learning model comprises training the first machine learning model to generate synthetic objects having variations of the one or more of the curve shape, the number of curves, the range of values, and the line style.

6. The method of claim 1, wherein the labeled object comprises a header section of a well log, wherein the feature comprises a line style, units, or a scale in the header section, and wherein training the first machine learning model comprises training the first machine learning model to generate synthetic objects having variations of the one or more of the line style, the units, or the scale.

7. The method of claim 6, wherein the variations include different relative locations for display of the line style, the units, or the scale in the individual synthetic objects.

8. The method of claim 1, wherein the labeled object comprises a natural language search query, wherein the feature comprises one or more of a country, a state, an operator identity, and a field need, and wherein training the first machine learning model comprises training the first machine learning model to generate synthetic objects having variations of the one or more of the country, the state, the operator, and the field need, and wherein training the second machine learning model comprises training the second machine learning model to label natural language search queries as database-specific language search queries.

9. The method of claim 1, wherein the first machine learning system comprises a generative adversarial network.

10. The method of claim 9, wherein the generative adversarial network comprises a generator and a discriminator.

11. A non-transitory, computer-readable medium storing instructions that, when executed by at least one processor of a computing system, cause the computing system to perform operations, the operations comprising:

generating a plurality of synthetic objects and associated labels using a trained first machine learning system that is trained to generate a synthetic object based at least in part on a feature of a labeled object, an assigned label that represents the feature, and stochastic variation input, wherein the synthetic objects include a stochastic variation output, wherein the stochastic variation input comprises single channel images including uncorrelated Gaussian noise, and wherein the stochastic variation output comprises one or more of:

erased or partially erased gridlines;

width and intensity variations in the gridlines;

noise on the gridlines;

intensity variation in curves; and width variation in the curves;

training a second machine learning model to predict labels for features of objects based at least in part on the plurality of synthetic objects and associated labels; and predicting a label for an unlabeled feature of an object using the second machine learning model.

12. The medium of claim 11, wherein the operations further comprise:

determining an uncertainty associated with labeling the unlabeled feature in the object using the trained second machine learning model;

determining that the uncertainty is greater than a predetermined value;

in response to determining that the uncertainty is greater than the predetermined value, soliciting an input of one or more training pairs of objects having the feature of the unlabeled object and an assigned label associated therewith;

generating a new plurality of synthetic objects and associated labels using the trained first machine learning system and the one or more training pairs of objects; and training the second machine learning model to predict labels for features of objects based at least in part on the plurality of new synthetic objects and associated labels.

13. The medium of claim 11, wherein the labeled object comprises a well log, wherein the feature comprises one or more of a header section, a depth track, and a plot segment, and wherein training the first machine learning model comprises training the first machine learning model to generate synthetic objects having variations of the one or more of the header section, the depth track, and the plot segment based on the labeled object.

14. The medium of claim 11, wherein the labeled object comprises a plot of a well log or a seismic survey log, wherein the feature comprises one or more of a curve shape, a number of curves, a range of values, and a line style, and wherein training the first machine learning model comprises training the first machine learning model to generate synthetic objects having variations of the one or more of the curve shape, the number of curves, the range of values, and the line style.

15. The medium of claim 11, wherein the labeled object comprises a header section of a well log, wherein the feature comprises a line style, units, or a scale in the header section, wherein training the first machine learning model comprises training the first machine learning model to generate synthetic objects having variations of the one or more of the line style, the units, and the scale, and wherein the variations include different relative locations for display of the line style, the units, and the scale in the individual synthetic objects.

16. The medium of claim 11, wherein the labeled object comprises a natural language search query, wherein the feature comprises one or more of a country, a state, an operator identity, and a field need, and wherein training the first machine learning model comprises training the first machine learning model to generate synthetic objects having variations of the one or more of the country, the state, the operator, and the field need, and wherein training the second machine learning model comprises training the second machine learning model to label natural language search queries as database-specific language search queries.

17. A computing system, comprising:

one or more processors; and a memory system including one or more non-transitory computer-readable media storing instructions that, when executed by at least one of the one or more processors, cause the computing system to perform operations, the operations comprising:

generating a plurality of synthetic objects and associated labels using a trained first machine learning system that is trained to generate a synthetic object based at least in part on a feature of a labeled object, an assigned label that represents the feature, and stochastic variation input, wherein the synthetic objects include a stochastic variation output, wherein the stochastic variation input comprises single channel images including uncorrelated Gaussian noise, and wherein the stochastic variation output comprises one or more of:

erased or partially erased gridlines;

width and intensity variations in the gridlines;

noise on the gridlines;

intensity variation in curves; and width variation in the curves;

training a second machine learning model to predict labels for features of objects based at least in part on the plurality of synthetic objects and associated labels; and predicting a label for an unlabeled feature of an object using the second machine learning model.

18. The computing system of claim 17, wherein the operations further comprise:

determining an uncertainty associated with labeling the unlabeled feature in the object using the trained second machine learning model;

determining that the uncertainty is greater than a predetermined value;

in response to determining that the uncertainty is greater than the predetermined value, soliciting an input of one or more training pairs of objects having the unlabeled feature of the object and an assigned label associated therewith;

generating a new plurality of synthetic objects and associated labels using the trained first machine learning system and the one or more training pairs of objects; and training the second machine learning model to predict labels for features of objects based at least in part on the plurality of new synthetic objects and associated labels.

* * * * *